(12) United States Patent
Alberding et al.

(10) Patent No.: US 8,545,963 B2
(45) Date of Patent: Oct. 1, 2013

(54) FLAME-RESISTANT COMPOSITE MATERIALS AND ARTICLES CONTAINING CARBON NANOTUBE-INFUSED FIBER MATERIALS

(75) Inventors: Mark R. Alberding, Glen Arm, MD (US); Harry C. Malecki, Abingdon, MD (US); Tushar K. Shah, Columbia, MD (US); Daniel J. Adcock, Columbia, MD (US)

(73) Assignee: Applied NanoStructured Solutions, LLC, Baltimore, MD (US)

( * ) Notice: Subject to any disclaimer, the term of this patent is extended or adjusted under 35 U.S.C. 154(b) by 415 days.

(21) Appl. No.: 12/968,187

(22) Filed: Dec. 14, 2010

(65) Prior Publication Data

US 2011/0143087 A1 Jun. 16, 2011

Related U.S. Application Data

(60) Provisional application No. 61/286,340, filed on Dec. 14, 2009.

(51) Int. Cl.
*B32B 5/12* (2006.01)
*B32B 5/16* (2006.01)

(52) U.S. Cl.
USPC ........... 428/114; 428/98; 428/105; 428/298.1

(58) Field of Classification Search
USPC ................................ 428/114, 98, 105, 298.1
See application file for complete search history.

(56) References Cited

U.S. PATENT DOCUMENTS

| | | |
|---|---|---|
| 2,412,707 A | 12/1946 | Barnett |
| 3,304,855 A | 2/1967 | Oebell |
| 3,584,758 A | 6/1971 | Moore |
| 4,104,083 A | 8/1978 | Hirano |
| 4,515,107 A | 5/1985 | Fournier et al. |

(Continued)

FOREIGN PATENT DOCUMENTS

| | | |
|---|---|---|
| CN | 101698975 | 4/2008 |
| CN | 101173386 A | 5/2008 |

(Continued)

OTHER PUBLICATIONS

U.S. Appl. No. 12/766,817, filed Apr. 23, 2010, Tushar K. Shah.

(Continued)

*Primary Examiner* — Brent O'Hern
(74) *Attorney, Agent, or Firm* — McDermott Will & Emery LLP

(57) ABSTRACT

Flame-resistant composite materials containing carbon nanotubes are described herein. The flame-resistant composite materials contain an outer layer and at least one inner layer, containing a first polymer matrix and a second polymer matrix, respectively. The outer layer has an exterior surface and a first carbon nanotube-infused fiber material that contains a first fiber material and a first plurality of carbon nanotubes greater than about 50 μm in length. In some embodiments, the at least one inner layer also contains a second fiber material and/or a second carbon nanotube-infused fiber material containing a second fiber material and a second plurality of carbon nanotubes. When present, the second plurality of carbon nanotubes are generally shorter in length than the first plurality of carbon nanotubes. Alignment of the carbon nanotubes in the outer layer can transfer heat away from the composite material's inner layer(s). Flame-resistant articles containing carbon nanotube-infused fiber materials are also described.

54 Claims, 5 Drawing Sheets

(56) References Cited

U.S. PATENT DOCUMENTS

| | | |
|---|---|---|
| 4,530,750 A | 7/1985 | Aisenberg et al. |
| 4,566,969 A | 1/1986 | Klein |
| 4,707,349 A | 11/1987 | Hjersted |
| 4,728,399 A | 3/1988 | Moehwald |
| 4,837,073 A | 6/1989 | McAllister et al. |
| 4,894,293 A | 1/1990 | Breit et al. |
| 4,920,917 A | 5/1990 | Nakatani et al. |
| 4,976,899 A | 12/1990 | Rousseau et al. |
| 5,093,155 A | 3/1992 | Miyazaki et al. |
| 5,130,194 A | 7/1992 | Baker et al. |
| 5,156,225 A | 10/1992 | Murrin |
| 5,173,367 A | 12/1992 | Liimatta et al. |
| 5,221,605 A | 6/1993 | Bard et al. |
| 5,223,353 A | 6/1993 | Ohsawa et al. |
| 5,225,265 A | 7/1993 | Prandy et al. |
| 5,227,238 A | 7/1993 | Hirai et al. |
| 5,238,808 A | 8/1993 | Bard et al. |
| 5,246,794 A | 9/1993 | Blomgren et al. |
| 5,310,687 A | 5/1994 | Bard et al. |
| 5,370,921 A | 12/1994 | Cedarleaf |
| 5,470,408 A | 11/1995 | Nielson et al. |
| 5,514,217 A | 5/1996 | Niino et al. |
| 5,547,525 A | 8/1996 | Bennett et al. |
| 5,571,749 A | 11/1996 | Matsuda et al. |
| 5,639,984 A | 6/1997 | Nielson |
| 5,714,089 A | 2/1998 | Bard et al. |
| 5,731,147 A | 3/1998 | Bard et al. |
| 5,744,075 A | 4/1998 | Klett et al. |
| 5,908,585 A | 6/1999 | Shibuta |
| 5,968,274 A | 10/1999 | Fujioka et al. |
| 5,997,832 A | 12/1999 | Lieber et al. |
| 6,140,138 A | 10/2000 | Bard et al. |
| 6,146,783 A | 11/2000 | Brohm et al. |
| 6,184,280 B1 | 2/2001 | Shibuta |
| 6,221,154 B1 | 4/2001 | Lee et al. |
| 6,232,706 B1 | 5/2001 | Dai et al. |
| 6,251,520 B1 | 6/2001 | Blizzard et al. |
| 6,265,466 B1 | 7/2001 | Glatkowski et al. |
| 6,331,209 B1 | 12/2001 | Jang et al. |
| 6,333,016 B1 | 12/2001 | Resasco et al. |
| 6,361,861 B2 | 3/2002 | Gao et al. |
| 6,382,120 B1 | 5/2002 | Keire |
| 6,413,487 B1 | 7/2002 | Resasco et al. |
| 6,420,293 B1 | 7/2002 | Chang et al. |
| 6,455,021 B1 | 9/2002 | Saito |
| 6,465,057 B1 | 10/2002 | Nakahigashi et al. |
| 6,479,028 B1 | 11/2002 | Kaner et al. |
| 6,479,030 B1 | 11/2002 | Firsich |
| 6,491,789 B2 | 12/2002 | Niu |
| 6,495,258 B1 | 12/2002 | Chen et al. |
| 6,528,572 B1 | 3/2003 | Patel et al. |
| 6,564,744 B2 | 5/2003 | Nakahigashi et al. |
| 6,653,619 B2 | 11/2003 | Chin et al. |
| 6,673,392 B2 | 1/2004 | Lee et al. |
| 6,692,717 B1 | 2/2004 | Smalley et al. |
| 6,699,525 B2 | 3/2004 | Jayatissa |
| 6,762,237 B2 | 7/2004 | Glatkowski et al. |
| 6,765,949 B2 | 7/2004 | Chang |
| 6,790,425 B1 | 9/2004 | Smalley et al. |
| 6,818,821 B2 | 11/2004 | Fujieda et al. |
| 6,837,928 B1 | 1/2005 | Zhang et al. |
| 6,852,410 B2 | 2/2005 | Veedu et al. |
| 6,863,942 B2 | 3/2005 | Ren et al. |
| 6,887,451 B2 | 5/2005 | Dodelet et al. |
| 6,900,264 B2 | 5/2005 | Kumar et al. |
| 6,900,580 B2 | 5/2005 | Dai et al. |
| 6,908,572 B1 | 6/2005 | Derbyshire et al. |
| 6,913,075 B1 | 7/2005 | Knowles et al. |
| 6,921,575 B2 | 7/2005 | Horiuchi et al. |
| 6,934,600 B2 | 8/2005 | Jang et al. |
| 6,936,653 B2 | 8/2005 | McElrath et al. |
| 6,955,800 B2 | 10/2005 | Resasco et al. |
| 6,962,892 B2 | 11/2005 | Resasco et al. |
| 6,967,013 B2 | 11/2005 | Someya et al. |
| 6,979,709 B2 | 12/2005 | Smalley et al. |
| 6,986,853 B2 | 1/2006 | Glatkowski et al. |
| 6,986,877 B2 | 1/2006 | Takikawa et al. |
| 6,994,907 B2 | 2/2006 | Resasco et al. |
| 7,011,760 B2 | 3/2006 | Wang et al. |
| 7,018,600 B2 | 3/2006 | Yanagisawa et al. |
| 7,022,776 B2 | 4/2006 | Bastiaens et al. |
| 7,045,108 B2 | 5/2006 | Jiang et al. |
| 7,056,452 B2 | 6/2006 | Niu et al. |
| 7,074,294 B2 | 7/2006 | Dubrow |
| 7,094,386 B2 | 8/2006 | Resasco et al. |
| 7,105,596 B2 | 9/2006 | Smalley et al. |
| 7,108,841 B2 | 9/2006 | Smalley et al. |
| 7,118,693 B2 | 10/2006 | Glatkowski et al. |
| 7,125,502 B2 | 10/2006 | Smalley et al. |
| 7,125,534 B1 | 10/2006 | Smalley et al. |
| 7,132,621 B2 | 11/2006 | Kumar et al. |
| 7,144,563 B2 | 12/2006 | Rao et al. |
| 7,148,619 B2 | 12/2006 | Ken et al. |
| 7,151,129 B2 | 12/2006 | Ishikawa et al. |
| 7,153,452 B2 | 12/2006 | Ogale et al. |
| 7,157,068 B2 | 1/2007 | Li et al. |
| 7,160,532 B2 | 1/2007 | Liu et al. |
| 7,211,320 B1 | 5/2007 | Cooper et al. |
| 7,226,643 B2 | 6/2007 | Juang et al. |
| 7,235,159 B2 | 6/2007 | Gu et al. |
| 7,253,442 B2 | 8/2007 | Huang et al. |
| 7,261,779 B2 | 8/2007 | Gardner |
| 7,265,174 B2 | 9/2007 | Carroll et al. |
| 7,265,175 B2 | 9/2007 | Winey et al. |
| 7,278,324 B2 | 10/2007 | Smits et al. |
| 7,285,591 B2 | 10/2007 | Winey et al. |
| 7,294,302 B2 | 11/2007 | Koide et al. |
| 7,329,698 B2 | 2/2008 | Noguchi et al. |
| 7,338,684 B1 | 3/2008 | Curliss et al. |
| 7,354,881 B2 | 4/2008 | Resasco et al. |
| 7,354,988 B2 | 4/2008 | Charati et al. |
| 7,372,880 B2 | 5/2008 | Jablonski et al. |
| 7,384,663 B2 | 6/2008 | Olry et al. |
| 7,399,794 B2 | 7/2008 | Harmon et al. |
| 7,407,640 B2 | 8/2008 | Barrera et al. |
| 7,407,901 B2 | 8/2008 | Bystricky et al. |
| 7,410,628 B2 | 8/2008 | Bening et al. |
| 7,411,019 B1 | 8/2008 | Bley |
| 7,419,601 B2 | 9/2008 | Cooper et al. |
| 7,431,965 B2 | 10/2008 | Grigorian et al. |
| 7,442,284 B2 | 10/2008 | Ren et al. |
| 7,445,817 B2 | 11/2008 | Kumar et al. |
| 7,448,441 B2 | 11/2008 | Hendricks et al. |
| 7,448,931 B2 | 11/2008 | Liu et al. |
| 7,459,627 B2 | 12/2008 | Lee et al. |
| 7,465,605 B2 | 12/2008 | Raravikar et al. |
| 7,473,466 B1 | 1/2009 | Muradov |
| 7,479,052 B2 | 1/2009 | Kim et al. |
| 7,488,455 B2 | 2/2009 | Dai et al. |
| 7,504,078 B1 | 3/2009 | Jacques et al. |
| 7,510,695 B2 | 3/2009 | Smalley et al. |
| 7,534,486 B2 | 5/2009 | Boerstoel et al. |
| 7,544,415 B2 | 6/2009 | Chen et al. |
| 7,563,411 B2 | 7/2009 | Jiang et al. |
| 7,563,428 B2 | 7/2009 | Resasco et al. |
| 7,569,425 B2 | 8/2009 | Huang et al. |
| 7,588,700 B2 | 9/2009 | Kwon et al. |
| 7,592,248 B2 | 9/2009 | Ventzek et al. |
| 7,597,869 B2 | 10/2009 | Hsiao |
| 7,608,798 B2 | 10/2009 | Kumar et al. |
| 7,611,579 B2 | 11/2009 | Lashmore et al. |
| 7,615,204 B2 | 11/2009 | Ajayan et al. |
| 7,615,205 B2 | 11/2009 | Jiang et al. |
| 7,632,550 B2 | 12/2009 | Mizuno et al. |
| 7,632,569 B2 | 12/2009 | Smalley et al. |
| 7,700,943 B2 | 4/2010 | Raravikar et al. |
| 7,709,087 B2 | 5/2010 | Majidi et al. |
| 7,718,220 B2 | 5/2010 | D'Silva et al. |
| 7,729,100 B2 | 6/2010 | Llorente Gonzalez et al. |
| 7,771,289 B2 | 8/2010 | Palumbo et al. |
| 7,771,798 B1 | 8/2010 | Grosse et al. |
| 7,776,777 B2 | 8/2010 | Kim et al. |
| 7,811,632 B2 | 10/2010 | Eres |
| 7,815,820 B2 | 10/2010 | Tan et al. |

| Patent No. | Date | Inventor |
|---|---|---|
| 7,816,709 B2 | 10/2010 | Balzano et al. |
| 7,862,795 B2 | 1/2011 | Zhang et al. |
| 7,867,468 B1 | 1/2011 | Haddon et al. |
| 7,867,616 B2 | 1/2011 | Harutyunyan |
| 7,871,591 B2 | 1/2011 | Harutyunyan et al. |
| 7,880,376 B2 | 2/2011 | Takai et al. |
| 7,927,701 B2 | 4/2011 | Curliss et al. |
| 8,048,490 B2 | 11/2011 | Watanabe et al. |
| 2002/0035170 A1 | 3/2002 | Glatkowski et al. |
| 2002/0085968 A1 | 7/2002 | Smalley et al. |
| 2002/0090331 A1 | 7/2002 | Smalley et al. |
| 2003/0024884 A1 | 2/2003 | Petrik |
| 2003/0042147 A1 | 3/2003 | Talin et al. |
| 2003/0044678 A1 | 3/2003 | Winarski |
| 2003/0094734 A1 | 5/2003 | Deckard et al. |
| 2003/0102585 A1 | 6/2003 | Poulin et al. |
| 2003/0111333 A1 | 6/2003 | Montgomery et al. |
| 2003/0166744 A1 | 9/2003 | Van Dijk et al. |
| 2004/0007955 A1 | 1/2004 | Yaniv et al. |
| 2004/0026234 A1 | 2/2004 | Vanden Brande et al. |
| 2004/0082247 A1 | 4/2004 | Desai et al. |
| 2004/0105807 A1 | 6/2004 | Fan et al. |
| 2004/0171725 A1 | 9/2004 | Richardson et al. |
| 2004/0184981 A1 | 9/2004 | Liu et al. |
| 2004/0245088 A1 | 12/2004 | Gardner |
| 2004/0253167 A1 | 12/2004 | Silva et al. |
| 2005/0023727 A1 | 2/2005 | Sampson |
| 2005/0042163 A1 | 2/2005 | Allison et al. |
| 2005/0049355 A1 | 3/2005 | Tang et al. |
| 2005/0062024 A1 | 3/2005 | Bessette et al. |
| 2005/0081752 A1 | 4/2005 | Snyder et al. |
| 2005/0090024 A1 | 4/2005 | Chopra |
| 2005/0090176 A1 | 4/2005 | Dean et al. |
| 2005/0100501 A1 | 5/2005 | Veedu et al. |
| 2005/0112052 A1 | 5/2005 | Gu et al. |
| 2005/0119371 A1 | 6/2005 | Drzal et al. |
| 2005/0172370 A1 | 8/2005 | Haq et al. |
| 2005/0176329 A1 | 8/2005 | Olry et al. |
| 2005/0188727 A1 | 9/2005 | Greywall |
| 2005/0204984 A1 | 9/2005 | Finot |
| 2005/0230560 A1 | 10/2005 | Glatkowski et al. |
| 2005/0260120 A1 | 11/2005 | Smalley et al. |
| 2005/0260412 A1 | 11/2005 | Gardner |
| 2005/0263456 A1 | 12/2005 | Cooper et al. |
| 2005/0287064 A1 | 12/2005 | Mayne et al. |
| 2006/0047052 A1 | 3/2006 | Barrera et al. |
| 2006/0052509 A1 | 3/2006 | Saitoh |
| 2006/0057361 A1 | 3/2006 | Ounaies et al. |
| 2006/0060825 A1 | 3/2006 | Glatkowski |
| 2006/0065546 A1 | 3/2006 | Curodeau |
| 2006/0078705 A1 | 4/2006 | Glatkowski et al. |
| 2006/0099135 A1 | 5/2006 | Yodh et al. |
| 2006/0110599 A1 | 5/2006 | Honma et al. |
| 2006/0118158 A1 | 6/2006 | Zhang et al. |
| 2006/0121275 A1 | 6/2006 | Poulin et al. |
| 2006/0135677 A1 | 6/2006 | Huang et al. |
| 2006/0159916 A1 | 7/2006 | Dubrow et al. |
| 2006/0166003 A1 | 7/2006 | Khabashesku et al. |
| 2006/0177602 A1 | 8/2006 | Dijon et al. |
| 2006/0198956 A1 | 9/2006 | Eres |
| 2006/0202168 A1 | 9/2006 | Barrera et al. |
| 2007/0003817 A1 | 1/2007 | Umeda et al. |
| 2007/0020167 A1 | 1/2007 | Han et al. |
| 2007/0048521 A1 | 3/2007 | Istvan |
| 2007/0054105 A1 | 3/2007 | Hsiao |
| 2007/0087198 A1 | 4/2007 | Dry |
| 2007/0092431 A1 | 4/2007 | Resasco et al. |
| 2007/0110977 A1 | 5/2007 | Al-Haik et al. |
| 2007/0128960 A1 | 6/2007 | Ghasemi Nejhad et al. |
| 2007/0135588 A1 | 6/2007 | Diakoumakos et al. |
| 2007/0189953 A1 | 8/2007 | Bai et al. |
| 2007/0259128 A1 | 11/2007 | Parsapour |
| 2007/0265379 A1 | 11/2007 | Chen et al. |
| 2008/0014431 A1 | 1/2008 | Lashmore et al. |
| 2008/0020193 A1 | 1/2008 | Jang et al. |
| 2008/0025906 A1 | 1/2008 | Lin et al. |
| 2008/0039557 A1 | 2/2008 | Li et al. |
| 2008/0048364 A1 | 2/2008 | Armenlades et al. |
| 2008/0053922 A1 | 3/2008 | Honsinger, Jr. et al. |
| 2008/0075954 A1 | 3/2008 | Wardle et al. |
| 2008/0118753 A1 | 5/2008 | Poulin et al. |
| 2008/0137890 A1 | 6/2008 | Petersen et al. |
| 2008/0145528 A1 | 6/2008 | Deng et al. |
| 2008/0155888 A1 | 7/2008 | Vick et al. |
| 2008/0160286 A1 | 7/2008 | Asrar et al. |
| 2008/0170982 A1 | 7/2008 | Zhang et al. |
| 2008/0173111 A1 | 7/2008 | Thostenson et al. |
| 2008/0176987 A1 | 7/2008 | Trever et al. |
| 2008/0182108 A1 | 7/2008 | Curliss et al. |
| 2008/0187648 A1 | 8/2008 | Hart et al. |
| 2008/0237922 A1 | 10/2008 | Vaidyanathan et al. |
| 2008/0247938 A1 | 10/2008 | Tsai et al. |
| 2008/0248275 A1 | 10/2008 | Jang et al. |
| 2008/0279753 A1 | 11/2008 | Harutyunyan |
| 2008/0286546 A1 | 11/2008 | Lashmore et al. |
| 2008/0286564 A1 | 11/2008 | Tsotsis |
| 2008/0311301 A1 | 12/2008 | Diss et al. |
| 2009/0020734 A1 | 1/2009 | Jang et al. |
| 2009/0047453 A1 | 2/2009 | Folaron et al. |
| 2009/0047502 A1 | 2/2009 | Folaron et al. |
| 2009/0068387 A1 | 3/2009 | Panzer et al. |
| 2009/0068461 A1 | 3/2009 | Reneker et al. |
| 2009/0072222 A1 | 3/2009 | Radisic et al. |
| 2009/0081383 A1 | 3/2009 | Alberding et al. |
| 2009/0081441 A1 | 3/2009 | Shah et al. |
| 2009/0092832 A1 | 4/2009 | Moireau |
| 2009/0099016 A1 | 4/2009 | Carruthers et al. |
| 2009/0099276 A1 | 4/2009 | Barrera et al. |
| 2009/0117363 A1 | 5/2009 | Wardle et al. |
| 2009/0121219 A1 | 5/2009 | Song et al. |
| 2009/0121727 A1 | 5/2009 | Lynch et al. |
| 2009/0126783 A1 | 5/2009 | Lin et al. |
| 2009/0136707 A1 | 5/2009 | Ueno |
| 2009/0140098 A1 | 6/2009 | Lengsfeld et al. |
| 2009/0176100 A1 | 7/2009 | Higashi et al. |
| 2009/0176112 A1 | 7/2009 | Kruckenberg et al. |
| 2009/0186214 A1 | 7/2009 | Lafdi et al. |
| 2009/0191352 A1 | 7/2009 | DuFaux et al. |
| 2009/0192241 A1 | 7/2009 | Raravikar et al. |
| 2009/0212430 A1 | 8/2009 | Wyland |
| 2009/0214800 A1 | 8/2009 | Saito |
| 2009/0220409 A1 | 9/2009 | Curliss et al. |
| 2009/0258164 A1 | 10/2009 | Nakai et al. |
| 2009/0277897 A1 | 11/2009 | Lashmore et al. |
| 2009/0282802 A1 | 11/2009 | Cooper et al. |
| 2009/0286079 A1 | 11/2009 | Barker et al. |
| 2009/0294753 A1 | 12/2009 | Hauge et al. |
| 2009/0311166 A1 | 12/2009 | Hart et al. |
| 2010/0000770 A1 | 1/2010 | Gupta et al. |
| 2010/0059243 A1 | 3/2010 | Chang |
| 2010/0074834 A1 | 3/2010 | Kim |
| 2010/0087042 A1 | 4/2010 | Kim et al. |
| 2010/0098931 A1 | 4/2010 | Daniel et al. |
| 2010/0099319 A1 | 4/2010 | Lashmore et al. |
| 2010/0143701 A1 | 6/2010 | Zhu et al. |
| 2010/0159240 A1 | 6/2010 | Shah et al. |
| 2010/0178825 A1 | 7/2010 | Shah et al. |
| 2010/0188833 A1 | 7/2010 | Liang et al. |
| 2010/0192851 A1 | 8/2010 | Shah et al. |
| 2010/0196697 A1 | 8/2010 | D'Silva et al. |
| 2010/0197848 A1 | 8/2010 | Verghese et al. |
| 2010/0206504 A1 | 8/2010 | Akiyama et al. |
| 2010/0210159 A1 | 8/2010 | Zhu |
| 2010/0221424 A1 | 9/2010 | Malecki et al. |
| 2010/0224129 A1 | 9/2010 | Malecki et al. |
| 2010/0227134 A1 | 9/2010 | Shah et al. |
| 2010/0254885 A1 | 10/2010 | Menchhofer et al. |
| 2010/0272891 A1 | 10/2010 | Malecki et al. |
| 2010/0276072 A1 | 11/2010 | Shah et al. |
| 2010/0279569 A1 | 11/2010 | Shah et al. |
| 2010/0311866 A1 | 12/2010 | Huang et al. |
| 2011/0017867 A1 | 1/2011 | Simmons et al. |
| 2011/0024409 A1 | 2/2011 | Shah et al. |
| 2011/0024694 A1* | 2/2011 | Shah et al. .......... 252/502 |
| 2011/0040007 A1 | 2/2011 | Chandrasekhar et al. |
| 2011/0068514 A1 | 3/2011 | Ruiz et al. |
| 2011/0089958 A1 | 4/2011 | Malecki et al. |
| 2011/0123735 A1 | 5/2011 | Shah et al. |

| | | | |
|---|---|---|---|
| 2011/0124483 | A1 | 5/2011 | Shah et al. |
| 2011/0174519 | A1 | 7/2011 | Shah et al. |
| 2011/0186775 | A1 | 8/2011 | Shah et al. |
| 2011/0297892 | A1 | 12/2011 | Shah et al. |
| 2012/0000691 | A1 | 1/2012 | Shah et al. |

FOREIGN PATENT DOCUMENTS

| | | |
|---|---|---|
| IN | 01900DE2008 A | 3/2010 |
| KR | 100829001 | 5/2008 |
| TW | 200833861 | 8/2008 |
| WO | WO 03/082733 | 10/2003 |
| WO | WO 2005/005554 | 1/2005 |
| WO | WO 2005/075341 | 8/2005 |
| WO | WO/2006/048531 A1 | 5/2006 |
| WO | WO/2006/115486 A1 | 11/2006 |
| WO | WO 2007/015710 | 2/2007 |
| WO | WO/2007/061854 A2 | 5/2007 |
| WO | WO 2007/063764 | 6/2007 |
| WO | WO/2007/089118 A1 | 8/2007 |
| WO | WO-2007/130979 A2 | 11/2007 |
| WO | WO/2007/149109 A2 | 12/2007 |
| WO | WO/2008/041183 A2 | 4/2008 |
| WO | WO/2008/054541 A2 | 5/2008 |
| WO | WO/2008/085634 A1 | 7/2008 |
| WO | WO/2008/115640 A2 | 9/2008 |
| WO | WO/2009/004346 A1 | 1/2009 |
| WO | WO 2009/103925 | 8/2009 |
| WO | WO 2009/110885 | 9/2009 |
| WO | WO 2009/124862 | 10/2009 |
| WO | WO-2011/053457 | 5/2011 |

OTHER PUBLICATIONS

U.S. Appl. No. 61/295,621, filed Jan. 15, 2010, Harry C. Malecki.

U.S. Appl. No. 61/297,704, filed Jan. 22, 2010, Tushar K. Shah.

Kramer, et al., Constrained Iron Catalysts for Single-Walled Carbon Nanotube Growth?, Langmuir 2005, 21, 8466-8470 [http://pubs.acs.org/dol/abs/10.1021/la0506729].

Lux, "PCT Application No. PCT/US2007/086875 Search Report and Written Opinion", May 13, 2008.

Vaccarini et al., "Reinforcement of an Epoxy Resin by Single Walled Nanotubes", AIP Conference Proceedings, Nov. 21, 2000, vol. 544, pp. 521-525.

Wang et al., "Processing and Property Investigation of Single-Walled Carbon Nanotube ISWNT) Buckypapaper/Epoxy Resin Matrix Nanocomposit", Composites Part A: Applied Science and Manufacturing, Oct. 1, 2004, pp. 1225-1232. Publisher: PCT/ Published in : PCT.

Zhang et al., "Integration and characterization of aligned carbon nanotubes on metal/silicon substrates and effects of water", Applied Surface Science 255 (2009) 5003-5008, entire document.

Ago, et al., "Colloidal Solution of Metal Nanoparticles as a Catalyst for Carbon Nanotube Growth", Proceedings Materials Research Society, Fall 2000, pp. A13.18.1-A13.18.5, vol. 633, Materials Research Society.

Bubert, et al., "Basic analytical investigation of plasma-chemically modified carbon fibers", Spectrochimica Acta Part B., 2002, pp. 1601-1610, vol. 57, Elsevier Science B.V.

Chae, et al., "A comparison of reinforcement efficiency of various types of carbon nanotubes in polyacrylonitrile fiber", Polymer, Nov. 21, 2005, pp. 10925-10935, vol. 46, No. 24, Elsevier Ltd.

Che, et al., "Chemical Vapor Deposition Based Synthesis of Carbon Nanotubes and Nanofibers Using a Template Method", Chem. Mater., 1998, pp. 260-267, vol. 10, American Chemical Society.

Chen, et al., "Basalt fiber-epoxy laminates with functionalized multi-walled carbon nanotubes", Composites, Part A, 2009, pp. 1082-1089, vol. 40, Elsevier Ltd.

Chen, et al., "Pulsed electrodeposition of Pt nanoclusters on carbon nanotubes modified carbon materials using diffusion restricting viscous electroyles", Electrochemistry Communications, Jun. 2007, pp. 1348-1354, vol. 9, Elsevier B.V.

Cl, et al., "Direct Growth of Carbon Nanotubes on the Surface of Ceramic Fibers", Carbon, 2005, pp. 883-886, vol. 43, No. 4, Elsevier Ltd.

Garcia, et al., "Aligned Carbon Nanotube Reinforcement of Advanced Composite Ply Interfaces," 49th AIAA/ASCE/AHS/ASC Structures, Structural Dynamics, and Materials Conference, Apr. 7-10, 2008, Schaumburg, IL, MIT, American Institute of Aeronautics and Astronautics, Inc.

Hsu, et al., "Optical Absorption and Thermal Transport of Individual Suspended Carbon Nanotube Bundles", Nano Lett., 2009, pp. 590-594, vol. 9, No. 2, American Chemical Society, Publication Date (Web): Jan. 13, 2009.

Jiang, et al., "Carbon nanotube-coated solid-phase microextraction metal fiber based on sol-gel technique", Journal of Chromatography A., May 29, 2009, pp. 4641-4647, vol. 1216, Elsevier B.V.

Jiang, et al., "Plasma-Enhanced Deposition of Silver Nanoparticles onto Polymer and Metal Surfaces for the Generation of Antimicrobial Characteristics", Journal of Applied Polymer Science, 2004, pp. 1411-1422, vol. 93, Wiley Periodicals, Inc.

Jung, et al., "Fabrication of radar absorbing structure (RAS) using GFR-nano composite and spring-back compensation of hybrid composite RAS shells", Composite Structures, 2006, pp. 571-576, vol. 75, Elsevier Ltd.

Kim, et al., "Processing, characterization, and modeling of carbon nanotube-reinforced multiscale composites," Composites Science and Technology, 2009, pp. 335,342, vol. 69, Elsevier Ltd.

Kind, et al., "Patterned Films of Nanotubes Using Microcontact Printing of Catalysts", Adv. Mater., 1999, pp. 1285-1289, vol. 11, No. 15, Wiley-VCH Verlag GmbH, D-69469 Weinheim.

Laachachi, et al., "A chemical method to graft carbon nanotubes onto a carbon fiber", Materials Letters, 2008, pp. 394-397, vol. 62, Elsevier B.V.

Lee, "Syntheses and properties of fluorinated carbon materials", Journal of Fluorine Chemistry, 2007, pp. 392-403, vol. 128, Elsevier B.V.

Lee, et al., "Fabrication and design of multi-layered radar absorbing structures of MWNT-filled glass/epoxy plain-weave composites", Composite Structures, 2006, pp. 397-405, vol. 76, Elsevier Ltd.

Li, et al., "A Miniature glucose/$O_2$ biofuel cell with single-walled carbon nanotubes-modified carbon fiber microelectrodes as the substrate", Electrochemistry Communications, Jun. 2008, pp. 851-854, vol. 10, Elsevier B.V.

Li, et al., "Electromagnetic Interference (EMI) Shielding of Single-Walled Carbon Nanotube Epoxy Composites", Nano Lett., 2006, pp. 1141-1145, vol. 6, No. 6, American Chemical Society.

Makris, et al., "Carbon Nanotubes Growth and Anchorage to Carbon Fibres", Carbon Nanotubes, 2006, pp. 57-58, vol. 222, Springer, The Netherlands.

Meyyappan, et al., "Carbon nanotube growth by PECVD: a review", Plasma Sources Sci. Technol., 2003, pp. 205-216, vol. 12, IOP Publishing Ltd, UK.

Mylvaganam, "Fabrication and Application of Polymer Composites Comprising Carbon Nanotubes", Recent Pat Nanotechnol., 2007, pp. 59-65, vol. 1, Bentham Science Publishers, Ltd.

Panhuis, et al., "Carbon Nanotube Mediated Reduction in Optical Activity in Polyaniline Composite Materials", J. Phys. Chem. C, 2008, pp. 1441-1445, vol. 112, American Chemical Society.

Pisco, et al., "Hollow fibers integrated with single walled carbon nanotubes: Bandgap modification and chemical sensing capability", Sensors and Actuators B, 2008, pp. 163-170, vol. 129, Elsevier B.V.

Račkauskas "Carbon nanotube growth and use in energy sector", Energetika, 2006, pp. 43-46, vol. 2.

Satishkumar, et al., "Bundles of aligned carbon nanotubes obtained by the pyrolysis of ferrocene-hydrocarbon mixtures: role of the metal nanoparticles produced in situ", Chemical Physics Letters, 1999, pp. 158-162, vol. 307, Elsevier Science B.V.

Suh, et al., "Highly ordered two-dimensional carbon nanotube arrays", Applied Physics Letters, Oct. 4, 2002, pp. 2047-2049, vol. 75, No. 14, American Institute of Physics.

Thostenson, et al., "Carbon nanotube/carbon fiber hybrid multiscale composites", J. Appl. Phys., 2002, pp. 6034-6037, vol. 91, No. 9, American Institute of Physics.

Wang, et al., "Penetration depth of atmospheric pressure plasma surface modification into multiple layers of polyester fabrics", Surface and Coatings Technology, 2007, pp. 77-83, vol. 202, Elsevier B.V.

Wichmann, et al., "Glass-fibre-reinforced composites with enhanced mechanical and electrical properties—Benefits and limitations of a nanoparticle modified matrix", Engineering Fracture Mechanics, 2006, pp. 2346-2359, vol. 73, Elisevier Ltd.

Xu, et al., "Bone-Shaped Nanomaterials for Nanocomposite Applications", Nano Lett., 2003, pp. 1135-1139, vol. 3, No. 8, American Chemical Society.

Yabe, et al., Synthesis of well-aligned carbon nanotubes by radio frequency plasma enhanced CVD method, Diamond and Related Materials, 2004, pp. 1292-1295, vol. 13, Elsevier B.V.

Yang, et al., "Electrical Conductivity and Electromagnetic Interference Shielding of Multi-walled Carbon Nanotube Filled Polymer Composites" Mater. Res. Soc. Symp. Proc., 2005, pp. HH5.3.1-HH.5.3.5, vol. 858E, Materials Research Society.

Yeh, et al., "Mechanical properties of phenolic-based nanocomposites reinforced by multi-walled carbon nanotubes and carbon fibers", Composites: Part A, 2008, pp. 677-684, vol. 39, No. 4.

Zhang, et al., "In situ growth of carbon nanotubes on inorganic fibers with different surface properties," Materials Chemistry and Physics, 2008, pp. 317-321, vol. 107, Science Direct.

Zhao, et al., "Growth of carbon nanotubes on the surface of carbon fibers", Carbon, 2007, pp. 380-383, vol. 46, No. 2, Elsevier Ltd.

Zhao, et al., "The growth of multi-walled carbon nanotubes with different morphologies on carbon fibers", Carbon, 2005, pp. 651-673, vol. 43, Elsevier Ltd.

Zhu, et al., "Carbon nanotube growth on carbon fibers", Diamond and Related Materials, 2003, pp. 1825-1825, vol. 12, Elsevier B.V.

Zhu, et al., "Synthesis of single-walled carbon nanotubes by the vertical floating catalyst method," Chinese Science Bulletin, 2002, pp. 159-162, vol. 47, No. 2.

Vaccarini, et al., "Reinforcement of an epoxy resin by single walled nanotubes," AIP Conference Proceedings 2000, <http://dx.doi.org/10/1063/1.1342567>.

* cited by examiner

FLAME-RESISTANT COMPOSITE MATERIALS AND ARTICLES CONTAINING CARBON NANOTUBE-INFUSED FIBER MATERIALS

CROSS-REFERENCE TO RELATED APPLICATIONS

This application claims the benefit of priority under 35 U.S.C. §119 from U.S. Provisional Patent Application Ser. No. 61/286,340, filed Dec. 14, 2009, which is incorporated herein by reference in its entirety. This application is also related to U.S. patent application Ser. Nos. 12/611,073, 12/611,101 and 12/611,103, all filed on Nov. 2, 2009, each of which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to composite materials and, more specifically, composite materials containing carbon nanotubes.

BACKGROUND

Flame resistance is a characteristic of a material causing it to self-extinguish upon removal of an ignition source. A commonly used test for quantifying flame resistance is ASTM D6413 (*Standard Test Method for Flame Resistance of Textiles*). In a garment or similar textile-containing article, a flame-resistant fabric can dramatically reduce bodily tissue damage and increase survival rates for the wearer. Likewise, when used in structural applications, a self-extinguishing, flame-resistant composite material can undergo significantly less, perhaps even superficial, damage compared to that experienced by a comparable composite material that is not flame-resistant. Although flame-resistant composite materials have garnered significant interest for structural applications, there remains a need for further development of these systems.

A number of factors have hampered the development and implementation of flame-resistant composite materials. Although the polymer matrix of a composite material can be treated with a number of flame retardant agents suitable for imparting flame resistance (e.g., bromine, halogen compounds, metal hydroxides, metal hydrates, transition metal compounds and phosphorus-nitrogen compounds), a number of these compounds have known health hazards. An even more significant issue with these flame retardant agents is that they are known to adversely impact the structural properties of a composite material, thereby limiting range of applications in which the composite material can be used. In addition to flame retardant agents, secondary coatings and/or insulation materials can be added to a composite material to confer flame resistance. However, these protective measures add unwanted weight and bulkiness to the composite material, thereby making the composite material unsuitable for many high performance applications. Further, addition of secondary coatings and insulation materials leads to increased production costs. Although some polymer matrices have inherent flame resistance (e.g., phenolic resins), composite materials based on these polymer matrices are not typically used for structural applications due their relative low mechanical strength.

In view of the foregoing, flame-resistant composite materials that maintain mechanical properties suitable for high performance structural applications would be of substantial benefit in the art. The embodiments described herein satisfy this need and provide related advantages as well. Features described herein that confer flame resistance to a composite material can also be exploited to prepare flame-resistant articles and textiles for non-structural applications.

SUMMARY

In some embodiments, flame-resistant composite materials described herein contain an outer layer and at least one inner layer. The outer layer has an exterior surface and contains a first polymer matrix and a first carbon nanotube-infused fiber material. The first carbon nanotube-infused fiber material contains a first plurality of carbon nanotubes and a first fiber material, where the first plurality of carbon nanotubes are greater than about 50 µm in length. The at least one inner layer contains a second polymer matrix.

In some embodiments, flame-resistant composite materials described herein contain an epoxy matrix having an outer layer and at least one inner layer, a first carbon nanotube-infused fiber material in the outer layer, and a second carbon nanotube-infused fiber material in the at least one inner layer. The outer layer has an exterior surface and a thickness that ranges between about 0.005" and about 0.1". The first carbon nanotube-infused fiber material contains a first plurality of carbon nanotubes and a first fiber material, where the first plurality of carbon nanotubes are greater than about 50 µm in length. The second carbon nanotube-infused fiber material contains a second plurality of carbon nanotubes and a second fiber material.

In other embodiments, flame-resistant articles described herein contain an outer layer and an interior layer. The outer layer has an exterior surface and contains a carbon nanotube-infused fiber material. The carbon nanotube-infused fiber material contains a plurality of carbon nanotubes and a fiber material. The interior layer is integral to the outer layer and includes a textile that lacks carbon nanotubes.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
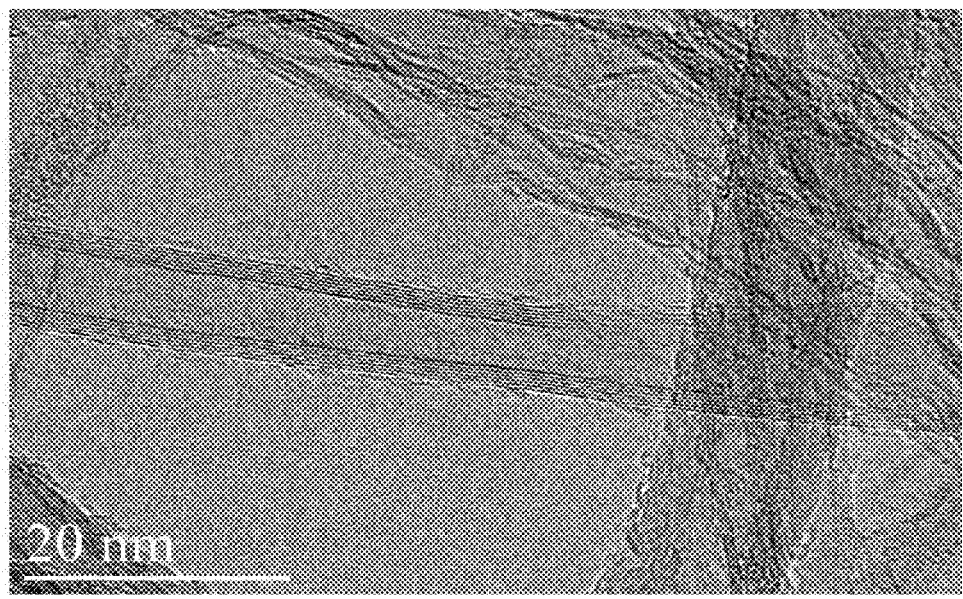
FIG. 1 shows an illustrative TEM image of carbon nanotubes that have been infused to carbon fibers.

The present disclosure is directed, in part, to flame-resistant composite materials and textiles containing carbon nanotube-infused fiber materials. The present disclosure is also directed, in part, to flame-resistant articles containing carbon nanotube-infused fiber materials and a textile that lacks carbon nanotubes.

In a composite material containing a fiber material and a polymer matrix, physical and/or chemical properties of the fiber material are imparted to the polymer matrix to produce a hybrid material having desirable features of both components. In the present composite materials, flame resistances of both the fiber material and the polymer matrix can be improved by the infusion of carbon nanotubes to the fiber material, and beneficial mechanical properties are maintained as in conventional composite materials. Advantageously, the composite materials and articles of the present disclosure have improved flame resistance without a requirement for adding costly or toxic flame retardant agents and/or additional thermal shielding.

Without being bound by theory or mechanism, Applicants believe that the improved flame resistance of the present composite materials and articles is due to the thermo-oxidative stability of carbon nanotubes and their density of coverage on carbon nanotube-infused fiber materials. By including a sufficient amount of suitable carbon nanotubes infused to a fiber material in the outer layer of the present flame-resistant composite materials and articles, an effective flame barrier can be formed. This flame barrier forms a sacrificial char layer on the exterior surface of the composite materials and articles in the presence of an ignition source but with minimal heat transfer occurring to and thermal decomposition occurring in the inner layer(s). Although, the outer layer can be damaged by the formation of char, the interior portions of the composite material and articles can remain relatively undamaged, and negligible impacts to structural properties can result.

In addition to their flame resistant-properties, carbon nanotube-infused fiber materials are a versatile platform for introducing carbon nanotubes into a composite matrix. Using carbon nanotube-infused fiber materials in composite materials allows significant problems associated with carbon nanotube incorporation therein to be overcome. Furthermore, by varying the length and coverage density of carbon nanotubes infused to the fiber material, different properties of the carbon nanotubes can be selectively conveyed to a composite material. For example, shorter carbon nanotubes are more typically suitable for enhancing structural properties of a composite material. Although longer carbon nanotubes can also convey structural support, they are more effectively used to establish an electrically or thermally conductive percolation pathway in a composite material. In addition, longer carbon nanotubes are believed to convey the best flame resistance in the composite materials and articles of the present disclosure. Non-uniform or gradient placement of the carbon nanotube-infused fiber materials in different regions of the composite material can be used to selectively convey a desired property, such as flame resistance, to a given region of a composite material.

As used herein, the term "fiber material" refers to any material that has a fibrous component as a basic structural component. The term encompasses continuous or non-continuous fibers, filaments, yarns, tows, tapes, woven and non-woven fabrics, plies, mats, and the like.

As used herein, the term "infused" refers to being bonded and "infusion" refers to the process of bonding. As such, a carbon nanotube-infused fiber material refers to a fiber material that has carbon nanotubes bonded thereto. Such bonding of carbon nanotubes to a fiber material can involve mechanical attachment, covalent bonding, ionic bonding, pi-pi interactions, and/or van der Waals force-mediated physisorption. In some embodiments, the carbon nanotubes are directly bonded to the fiber material. In other embodiments, the carbon nanotubes are indirectly bonded to the fiber material via a barrier coating and/or a catalytic nanoparticle used to mediate growth of the carbon nanotubes. The particular manner in which the carbon nanotubes are infused to the fiber material can be referred to as the bonding motif.

As used herein, the terms "flame resistant" or "flame resistance" refer to a material that is at least partially self-extinguishing when a source of ignition is removed.

As used herein, the term "nanoparticle" refers to particles having a diameter between about 0.1 nm and about 100 nm in equivalent spherical diameter, although the nanoparticles need not necessarily be spherical in shape.

As used herein, the terms "sizing agent," or "sizing," collectively refer to materials used in the manufacture of fiber materials that act as a coating to protect the integrity of the fiber material, to provide enhanced interfacial interactions between the fiber material and a composite matrix, and/or to alter and/or to enhance certain physical properties of the fiber material.

As used herein, the term "spoolable dimensions" refers to fiber materials that have at least one dimension that is not limited in length, thereby allowing the fiber material to be stored on a spool or mandrel following infusion with carbon nanotubes. Fiber materials of "spoolable dimensions" have at least one dimension that indicates the use of either batch or continuous processing for carbon nanotube infusion to the fiber material. An illustrative carbon fiber material of spoolable dimensions that is commercially available is AS4 12k carbon fiber tow with a tex value of 800 (1 tex=1 g/1,000 m) or 620 yard/lb (Grafil, Inc., Sacramento, Calif.). Commercial carbon fiber tow, in particular, can be obtained in 5, 10, 20, 50, and 100 lb. spools, for example, although larger spools can require special order.

As used herein, the term "transition metal" refers to any element or alloy of elements in the d-block of the periodic table (Groups 3 through 12), and the term "transition metal salt" refers to any transition metal compound such as, for example, transition metal oxides, carbides, nitrides, and the like. Illustrative transition metals that form catalytic nanoparticles suitable for synthesizing carbon nanotubes include, for example, Ni, Fe, Co, Mo, Cu, Pt, Au, Ag, alloys thereof, salts thereof, and mixtures thereof.

As used herein, the term "uniform in length" refers to a condition in which carbon nanotubes have lengths with tolerances of plus or minus about 20% or less of the total carbon nanotube length, for carbon nanotube lengths ranging between about 1 µm to about 500 µm. At very short carbon nanotube lengths (e.g., about 1 µm to about 4 µm), the tolerance can be plus or minus about 1 µm, that is, somewhat more than about 20% of the total carbon nanotube length.

As used herein, the term "uniform in density distribution" refers to a condition in which the carbon nanotube density on a fiber material has a tolerance of plus or minus about 10% coverage over the fiber material surface area that is covered by carbon nanotubes.

As used herein, the term "polymer matrix" refers to a bulk polymer material than can organize carbon nanotube-infused fiber materials into particular orientations, including random orientations, aligned orientations, perpendicular orientations, parallel orientations, and combinations thereof.

In some embodiments, flame-resistant composite materials of the present disclosure contain an outer layer and at least one inner layer. The outer layer has an exterior surface and contains a first polymer matrix and a first carbon nanotube-infused fiber material. The first carbon nanotube-infused fiber material contains a first plurality of carbon nanotubes and a first fiber material, where the first plurality of carbon nanotubes are greater than about 50 μm in length. The at least one inner layer contains a second polymer matrix. In some embodiments, the at least one inner layer further includes a second carbon nanotube-infused fiber material that contains a second plurality of carbon nanotubes and a second fiber material, where the second plurality of carbon nanotubes are less than about 50 μm in length.

In some embodiments, flame-resistant composite materials of the present disclosure contain an epoxy matrix having an outer layer and an inner layer, a first carbon nanotube-infused fiber material in the outer layer, and a second carbon nanotube-infused fiber material in the inner layer. The outer layer has an exterior surface and a thickness that ranges between about 0.005" and about 0.1". The first carbon nanotube-infused fiber material contains a first plurality of carbon nanotubes and a first fiber material, where the first plurality of carbon nanotubes are greater than about 50 μm in length. The second carbon nanotube-infused fiber material contains a second plurality of carbon nanotubes and a second fiber material.

Figure 2:
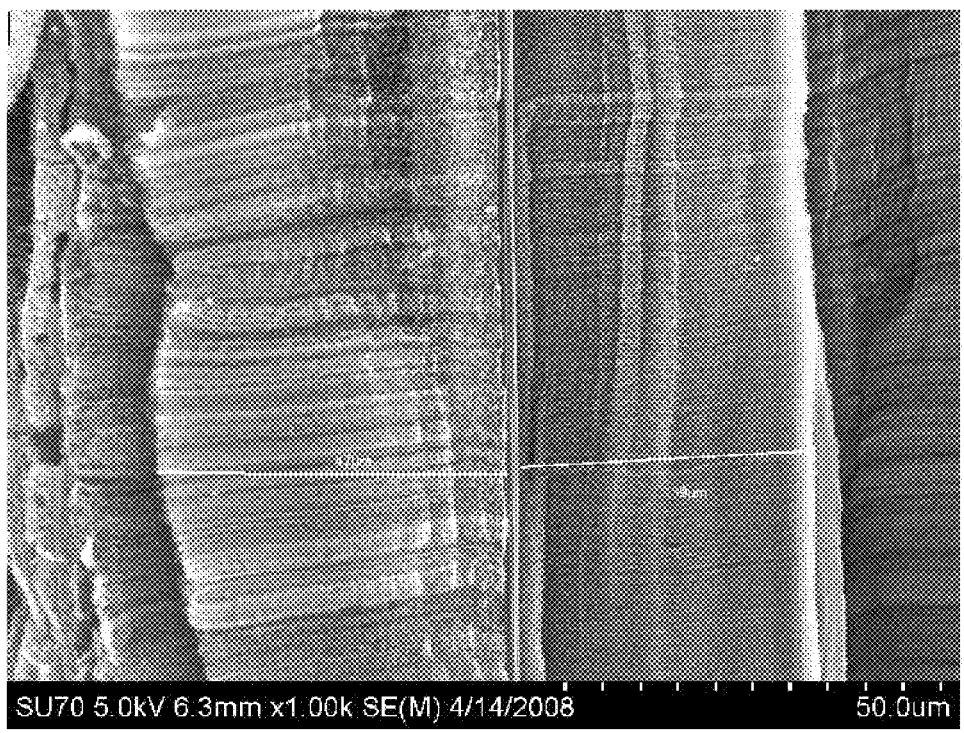
FIG. 2 shows an illustrative SEM image of a carbon fiber that has been infused with carbon nanotubes, where the carbon nanotubes are within ±20% of a targeted length of 40 µm.

Fiber materials that have been infused with carbon nanotubes, including carbon fibers, ceramic fibers, metal fibers, and glass fibers, are described in Applicants' co-pending U.S. patent application Ser. Nos. 12/611,073, 12/611,101, and 12/611,103, all filed on Nov. 2, 2009, each of which is incorporated herein by reference in its entirety. Additional details concerning the infusion of carbon nanotubes to a fiber material are set forth in further detail hereinbelow. FIG. 1 shows an illustrative TEM image of carbon nanotubes that have been infused to carbon fibers. FIG. 2 shows an illustrative SEM image of a carbon fiber that has been infused with carbon nanotubes, where the carbon nanotubes are within ±20% of a targeted length of 40 μm. In the images of FIGS. 1 and 2, the carbon nanotubes are multi-wall carbon nanotubes, although any carbon nanotubes such as single-wall carbon nanotubes, double-wall carbon nanotubes, and multi-wall carbon nanotubes having more than two walls can be infused to the fiber materials in the present flame-resistant composite materials and articles. In general, single-wall carbon nanotubes have a better thermal conductivity than do carbon nanotubes having more than one wall, but the overall performance of infused carbon nanotubes in the present embodiments can be a function of their thermo-oxidative stability in addition to their thermal conductivity. Although FIGS. 1 and 2 show the infusion of carbon nanotubes to a carbon fiber material, these images are merely illustrative of a type of fiber material that can be infused with carbon nanotubes and included in the present composite materials and articles. In various embodiments, fiber materials that can be infused with carbon nanotubes and included in the present flame-resistant composite materials and articles include, for example, glass fibers, carbon fibers, ceramic fibers, and organic fibers (e.g., aramid fibers). In embodiments in which both a first fiber material and a second fiber material are present, the first fiber material and the second fiber material can be independently selected from fibers such as, for example, carbon fibers, ceramic fibers, glass fibers, organic fibers, or any combination thereof.

There are three types of carbon fibers that are categorized based on the precursors used to generate the fibers, any of which can be used in the various embodiments described herein: Rayon, Polyacrylonitrile (PAN) and Pitch. Carbon fibers from rayon precursors, which are cellulosic materials, have a relatively low carbon content of about 20%, and the fibers tend to have a low strength and stiffness. In contrast, PAN precursors provide carbon fibers having a carbon content of about 55% and an excellent tensile strength due to a minimum of surface defects. Pitch precursors based on petroleum asphalt, coal tar, and polyvinyl chloride can also be used to produce carbon fibers. Although pitches are relatively low in cost and high in carbon yield, there can be issues of non-uniformity in a given batch of the resultant carbon fibers.

The types of carbon nanotubes infused to the fiber materials of the present flame-resistant composite materials and articles can generally vary without limitation. In various embodiments, the carbon nanotubes infused to the fiber material can be, for example, any of a number of cylindrically-shaped allotropes of carbon of the fullerene family including single-walled carbon nanotubes (SWNTs), double-walled carbon nanotubes (DWNTs), multi-walled carbon nanotubes (MWNTs), and any combination thereof. In some embodiments, the carbon nanotubes can be capped with a fullerene-like structure. Stated another way, the carbon nanotubes have closed ends in such embodiments. However, in other embodiments, the carbon nanotubes remain open-ended. In some embodiments, the carbon nanotubes encapsulate other materials. In some embodiments, the carbon nanotubes are covalently functionalized after becoming infused to the fiber material. Functionalization can be used to increase the compatibility of the carbon nanotubes with certain polymer matrices. In some embodiments, a plasma process can be used to promote functionalization of the carbon nanotubes.

Carbon nanotube lengths infused to a fiber material can vary over a wide range. In some embodiments, an average length of infused carbon nanotubes is between about 1 μm and about 10 μm. Carbon nanotubes having such lengths can be useful, for example, in applications to increase shear strength. In other embodiments, an average length of infused carbon nanotubes is between about 5 μm and about 70 μm. Carbon nanotubes having such lengths can be useful in applications including, for example, increased tensile strength, particularly if the carbon nanotubes are aligned substantially parallel with the longitudinal axis of the fiber material. In still other embodiments, an average length of infused carbon nanotubes is between about 10 μm and about 100 μm. Carbon nanotubes having such lengths can be useful, for example, to improve electrical and thermal conductivity properties, in addition to mechanical properties. In some embodiments, an average length of infused carbon nanotubes is between about 100 μm and about 500 μm. Carbon nanotubes having such lengths can be particularly beneficial to improve electrical and thermal conductivity properties, for example.

In various embodiments of the present flame-resistant composite materials, the first plurality of carbon nanotubes infused to the first fiber material of the outer layer are greater than about 50 μm in length. Applicants have discovered that in composite materials, shorter carbon nanotubes (i.e., carbon nanotubes that are less than about 50 μm in length) offer a greater degree of structural reinforcement per unit weight than do longer carbon nanotubes (i.e., carbon nanotubes that are greater than about 50 μm in length). Although longer carbon nanotubes can provide some degree of structural reinforcement, they do so at a cost of increased weight in the composite material, which can be unsuitable for certain high performance applications. However, Applicants have discovered that longer carbon nanotubes are especially well suited for conferring flame resistance to a composite material. By including longer carbon nanotubes in the outer layer of the present flame-resistant composite materials, Applicants have developed a composite material that maintains good structural properties and light weight, while having good flame-resistance on its exterior. In some embodiments, the first plurality of carbon nanotubes infused to the first fiber material of the outer layer are between about 50 μm and about 100 μm in length. In other embodiments, first plurality of carbon nanotubes infused to the first fiber material of the outer layer are greater than about 100 μm in length, or greater than about 200 μm in length, or greater than about 300 μm in length, or greater than about 400 μm in length, or greater than about 500 μm in length, or any subrange in between any of these values.

In some embodiments of the present flame-resistant composite materials, the at least one inner layer can also include at least one component such as a second fiber material, a second carbon nanotube-infused fiber material containing a second plurality of carbon nanotubes and a second fiber material, and various combinations thereof. In some embodiments, the first fiber material and the second fiber material are the same. In other embodiments, the first fiber material and the second fiber material are different. In some embodiments, the fiber material in the at least one inner layer lacks carbon nanotubes. For example, the flame-resistant composite materials of the present disclosure in various embodiments can contain carbon nanotube-infused carbon fibers, carbon nanotube-infused glass fibers, carbon nanotube-infused ceramic fibers, and/or carbon nanotube-infused organic fibers in the outer layer, while the at least one inner layer contains carbon fibers, glass fibers, ceramic fibers, and/or organic fibers that lack carbon nanotube infusion. However, the flame-resistant composite materials of the present disclosure in other various embodiments can contain carbon nanotube-infused carbon fibers, carbon nanotube-infused glass fibers, carbon nanotube-infused ceramic fibers, and/or carbon nanotube-infused organic fibers in the outer layer, while the at least one inner layer also contains carbon nanotube-infused carbon fibers, carbon nanotube-infused glass fibers, carbon nanotube-infused ceramic fibers, and/or carbon nanotube-infused organic fibers. Mixtures of carbon nanotube-infused fiber materials and fiber materials lacking carbon nanotube infused can also be contained in the at least one inner layer.

In some embodiments, the second plurality of carbon nanotubes infused to the second fiber material of the inner layer(s) have a length that is less than that of the first plurality of carbon nanotubes. This feature allows the carbon nanotubes in the second carbon nanotube-infused fiber material to be directed more toward structural reinforcement or another property of the composite material (e.g., tensile strength, Young's Modulus, shear strength, shear modulus, toughness, compression strength, compression modulus, density, electromagnetic wave absorptivity/reflectivity, acoustic transmittance, electrical conductivity, and/or thermal conductivity) rather than toward conferring flame resistance, for example. Further, it avoids the addition of unnecessary weight to the flame-resistant composite material where flame resistance is not needed. In some embodiments, the second plurality of carbon nanotubes are less than about 50 μm in length. In other embodiments, the second plurality of carbon nanotubes are less than about 20 μm in length. In still other embodiments, the second plurality of carbon nanotubes are between about 1 μm and about 10 μm in length.

In alternative embodiments, however, the second plurality of carbon nanotubes can have a length that is greater than or equal to that of the first plurality of carbon nanotubes. For example, in some embodiments, the second plurality of carbon nanotubes are greater than about 50 μm in length. Having longer carbon nanotubes in the inner layer(s) of a composite material might be desirable, for example, when an electrically or thermally conductive flame-resistant composite material is needed. In such embodiments, the first plurality of carbon nanotubes in the outer layer are operable to convey flame resistance to the composite material, and the second plurality of carbon nanotubes in the inner layer(s) are operable to establish an electrically or thermally conductive percolation pathway within the composite material, which could remain intact even after the outer layer is sacrificed in a flame event.

In still other alternative embodiments, the second plurality of carbon nanotubes of the inner layer(s) can contain a mixture of carbon nanotube lengths, some of which are longer than that of the first plurality of carbon nanotubes and some of which are shorter. In such embodiments, the longer carbon nanotubes of the inner layer(s) are operable to establish an electrically or thermally conductive percolation pathway within the composite material, while the shorter carbon nanotubes of the inner layer(s) are operable, for example, to enhance the structural properties of the composite material. As a non-limiting example, in some embodiments the first plurality of carbon nanotubes are greater than about 50 μm in length, and the second plurality of carbon nanotubes includes a portion of carbon nanotubes that are less than about 50 μm in length and a portion of carbon nanotubes that are greater than about 50 μm in length.

As noted above, the present flame-resistant composite materials can have their flame resistance properties primarily conferred to their outer layer in order to limit impacts on structural performance elsewhere in the composite material. When exposed to a flame condition, the outer layer of the present composite materials can form a sacrificial char layer that discourages further burning upon removal of an ignition source. Under these conditions, the inner layer(s) of the composite material can remain substantially unaffected, and the structural properties of the composite material can remain essentially unperturbed.

The thickness of the composite material's outer layer can be tailored to specific applications having a wide range of ignition conditions. For example, in high temperature applications having intense flames, thicker outer layers can provide better flame resistance. However, if the exposure time to the ignition conditions is relatively short or the flame is not particularly intense, a thinner outer layer can suffice. In some embodiments, the thickness of the outer layer ranges between about 0.005" and about 0.1" In other embodiments, the thickness of the outer layer ranges between about 0.005" and about 0.015" or between about 0.015" and about 0.05". In still other embodiments, the thickness of the outer layer ranges between about 0.1" and about 1".

In some embodiments, the first plurality of carbon nanotubes is present in an amount ranging between about 0.1% and about 20% of the outer layer by weight. In other embodiments, the first plurality of carbon nanotubes is present in an amount between about 0.1% and about 5% or between about 5% and about 10% of the outer layer by weight. Control over the amount of carbon nanotubes in the outer layer can allow the degree of flame resistance to be tailored to a specific application.

When present, the second plurality of carbon nanotubes can be present in an amount ranging between about 0.1% and about 10% of the at least one inner layer by weight. In other embodiments, the second plurality of carbon nanotubes is present in an amount ranging between about 0.1% and about 3% or between about 3% and about 5% of the at least one inner layer by weight. Among other properties, control over the amount of carbon nanotubes in the at least one inner layer can modify the mechanical properties of the composite material to be suited for a particular application.

In various embodiments of the present disclosure, the second plurality of carbon nanotubes, when present, can form a lower weight percentage of the flame-resistant composite material than does the first plurality of carbon nanotubes. In such embodiments, high concentrations of carbon nanotubes, including those noted above, can be used in the outer layer, while lower concentrations can be used in the at least one inner layer to address a desired property such as, for example, structural reinforcement. In various embodiments, the first plurality of carbon nanotubes and the second plurality of carbon nanotubes are collectively present in an amount that is less than about 20% of the flame-resistant composite material by weight. In some embodiments, the first plurality of carbon nanotubes and the second plurality of carbon nanotubes are collectively present in an amount ranging between about 0.1% and about 10% of the flame resistant composite material by weight. In other embodiments, the first plurality of carbon nanotubes and the second plurality of carbon nanotubes are collectively present in an amount ranging between about 0.5% and about 9% of the flame-resistant composite material by weight or between about 1% and about 7.5% of the flame-resistant composite material by weight, including all subranges in between these values. One of ordinary skill in the art with the benefit of this disclosure will recognize that the flame resistance of the outer layer and the mechanical properties of the at least one inner layer can be tailored to include a suitable amount of carbon nanotubes to optimize each property, while keeping the total carbon nanotube concentration within the above ranges.

Polymer matrices that can be used to form the present flame-resistant composite materials can be any polymer matrix that is typically used in conventional fiber-reinforced polymer composite materials. In some embodiments, the first polymer matrix and the second polymer matrix are the same. This condition assures a maximized compatibility between the outer layer and the at least one inner layer, which often generates optimal structural properties. However, in alternative embodiments, the first polymer matrix and the second polymer matrix are different. One of ordinary skill in the art will recognize certain conditions under which one could benefit from having different identities for the first polymer matrix and the second polymer matrix. For example, in certain applications, it might be beneficial to have a thin outer layer containing a heavy, impact resistant polymer matrix and less dense inner layers containing a different polymer matrix.

In some embodiments, suitable polymer matrices can include, for example, an epoxy, a polyester, a vinylester, a polyetherimide, a polyetherketoneketone, a polyphthalamide, a polyetherketone, a polyetheretherketone, a polyimide, a phenol-formaldehyde, or a bismaleimide. More generally, thermoplastic polymers, thermosetting polymers and elastomeric polymers are suitable polymer matrices. Suitable thermosetting polymer matrices include, for example, phthalic/maelic type polyesters, vinyl esters, epoxies, phenolics, cyanates, bismaleimides, and nadic end-capped polyimides (e.g., PMR-15). Suitable thermoplastic polymer matrices include, for example, polysulfones, polyamides, polycarbonates, polyphenylene oxides, polysulfides, polyether ether ketones, polyether sulfones, polyamide-imides, polyetherimides, polyimides, polyarylates, and liquid crystalline polyesters.

In some embodiments, both the first polymer matrix and the second polymer matrix are an epoxy. One of ordinary skill in the art will recognize that epoxy matrices are commonly included in composite materials that are used in structural applications, and many of these epoxy matrices are suitable for inclusion in the present flame-resistant composite materials. In general, epoxies are curable by reacting an epoxide group therein. Further, epoxies can be a two-component epoxy or self-curable.

Figure 3:
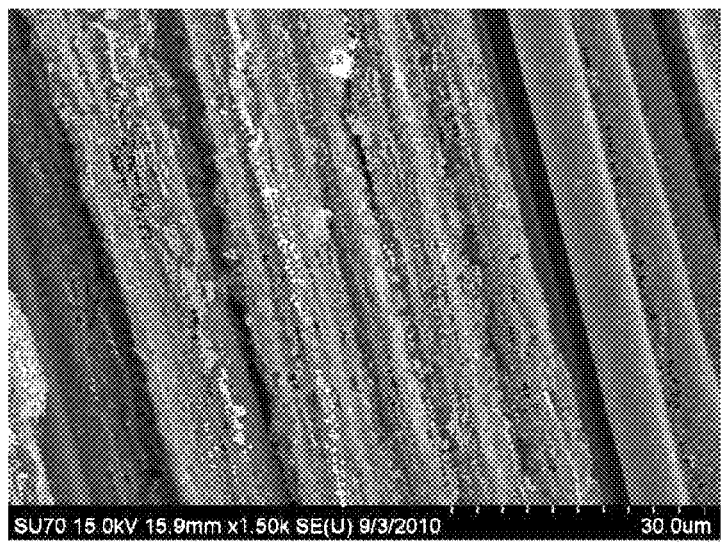
FIG. 3 shows an illustrative SEM image of a fiber tow within a fabric weave of carbon nanotube-infused carbon fibers.

The form of the fiber material used in the present flame-resistant composite materials can vary over a wide range. In various embodiments, the fiber material can be in non-limiting forms of continuous or non-continuous filaments, rovings, yarns, fiber tows, tapes, fiber-braids, woven fabrics, non-woven fabrics, fiber plies (e.g., unidirectional fiber plies), and other three-dimensional woven or non-woven structures. For example, in embodiments in which the fiber material is a carbon fiber, the fiber material can be in non-limiting forms including a continuous or non-continuous carbon filament, carbon roving, carbon fiber yarn, carbon fiber tow, carbon tape, carbon fiber-braid, woven carbon fabric, non-woven carbon fiber mat, carbon fiber ply, and other three-dimensional woven or non-woven structures. FIG. 3 shows an illustrative SEM image of a fiber tow within a fabric weave of carbon nanotube-infused carbon fibers. In various embodiments, carbon nanotubes of uniform length and distribution can be infused to spoolable lengths of filaments, fiber tows, tapes, fabrics and other three-dimensional woven structures. While various filaments, fiber tows, yarns, mats, woven and non-woven fabrics and the like can be directly infused with carbon nanotubes, it is also possible to generate such higher ordered structures from the parent fiber tow, yarn or the like from carbon nanotube-infused fibers. For example, a carbon nanotube-infused fiber material can be transformed into a woven fabric from a carbon nanotube-infused fiber tow. In some embodiments, woven fabrics can contain a mixture of fiber types such as, for example, a mixture of carbon fibers, glass fibers, ceramic fibers, and/or organic fibers.

Filaments include high aspect ratio fibers having diameters generally ranging in size between about 1 µm and about 100 µm. Rovings include soft strands of fiber that have been twisted, attenuated and freed of foreign matter.

Fiber tows are generally compactly associated bundles of filaments, which can be twisted together to give yarns in some embodiments. Yarns include closely associated bundles of twisted filaments, wherein each filament diameter in the yarn is relatively uniform. Yarns have varying weights described by their 'tex,' (expressed as weight in grams per 1000 linear meters), or 'denier' (expressed as weight in pounds per 10,000 yards). For yarns, a typical tex range is usually between about 200 and about 2000.

Fiber braids represent rope-like structures of densely packed fibers. Such rope-like structures can be assembled from yarns, for example. Braided structures can include a hollow portion. Alternately, a braided structure can be assembled about another core material.

Fiber tows can also include associated bundles of untwisted filaments. As in yarns, filament diameter in a fiber tow is generally uniform. Fiber tows also have varying weights and a tex range that is usually between about 200 and 2000. In addition, fiber tows are frequently characterized by the number of thousands of filaments in the fiber tow, such as, for example, a 12K tow, a 24K tow, a 48K tow, and the like.

Tapes are fiber materials that can be assembled as weaves or as non-woven flattened fiber tows, for example. Tapes can vary in width and are generally two-sided structures similar to a ribbon. In the various embodiments described herein, carbon nanotubes can be infused to the fiber material of a tape on one or both sides of a tape. In addition, carbon nanotubes of different types, diameters or lengths can be grown on each side of a tape. Tapes having different types, diameters or lengths on each side of the tape can be advantageous in some embodiments of the present flame-resistant composite materials. As described in Applicants' co-pending United States patent applications, infusion of carbon nanotubes to spools of tape can be conducted in a continuous manner.

In some embodiments, fiber materials can be organized into fabric or sheet-like structures. These include, for example, woven fabrics, non-woven fiber mats and fiber plies, in addition to the tapes described above. Such higher ordered structures can be assembled from parent fiber tows, yarns, filaments or the like, with carbon nanotubes already infused on the fiber material. As with tapes, such structures can also serve as a substrate for continuous infusion of carbon nanotubes thereon.

Figure 4:
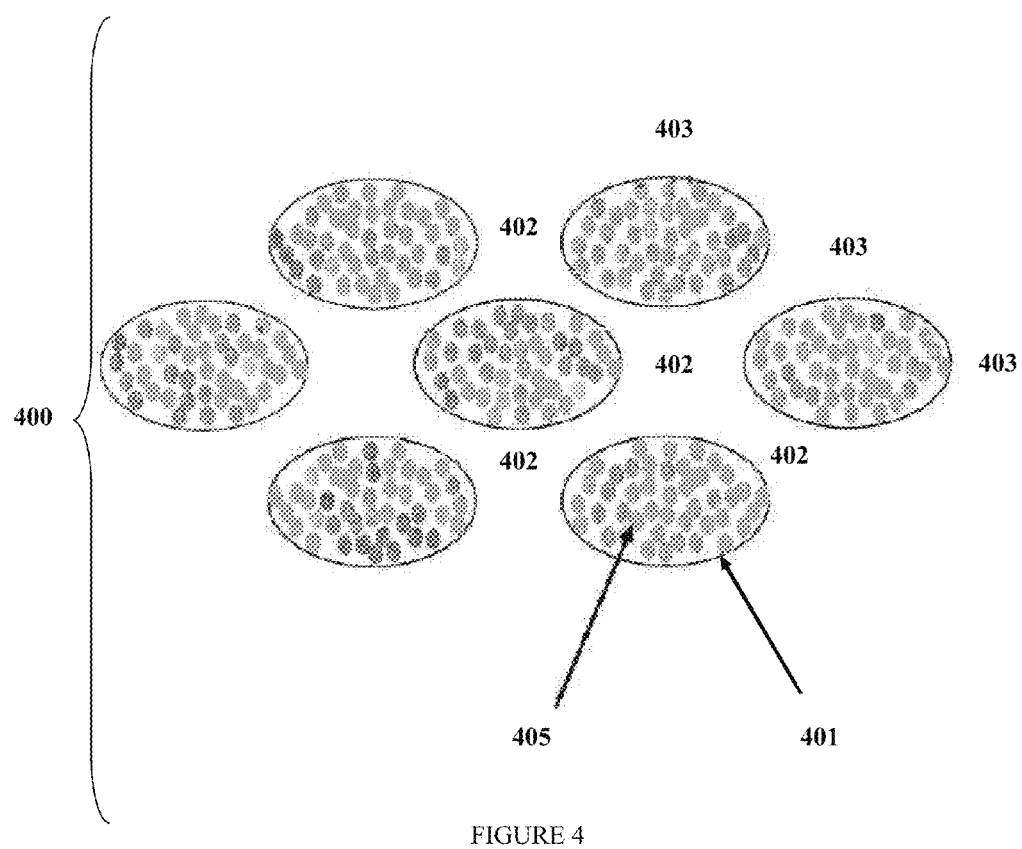
FIG. 4 shows a schematic of a roving having a plurality of fiber tows, each containing a plurality of fibers.

In some embodiments, carbon nanotubes can be infused to the fiber material at the tow or roving level prior to textile weaving. In such embodiments, carbon nanotubes can occupy both intra-tow and inter-tow space to achieve a high carbon nanotube loading. FIG. 4 shows a schematic of a roving 400 having a plurality of fiber tows 401, each containing a plurality of fibers 405. Inter-tow spaces 402 and inter-tow spaces 403 are illustrated in the FIGURE. In alternative embodiments, infusion with carbon nanotubes can take place according to the procedures described herein after weaving a tow or roving into a specified weave architecture.

Carbon nanotube-infused fiber materials prepared according to the processes described herein have much higher carbon nanotube loading percentages than are produced by other methods. This feature allows the composite materials of the present disclosure to contain much higher loading percentages of carbon nanotubes than are attainable in composite materials produced by more conventional techniques. In particular, carbon nanotube-infused fiber materials allow a well-blended carbon nanotube composite material to be attained. In general, the carbon nanotube-infused fiber materials of the present disclosure can contain between about 1% and about 30% carbon nanotubes by weight. In some embodiments, up to 40% carbon nanotubes by weight can be infused to the fiber material. In various embodiments, the first carbon nanotube-infused fiber material of the outer layer contains between about 1% and about 30% carbon nanotubes by weight. When present, the second carbon nanotube-infused fiber material of the at least one inner layer can also contain between about 1% and about 30% carbon nanotubes by weight, or a different range of carbon nanotube weights, if desired.

As described in Applicants' co-pending applications, a fiber material is modified to provide a layer (typically no more than a monolayer) of catalytic nanoparticles on the fiber material for the purpose of growing carbon nanotubes thereon. In various embodiments, the catalytic nanoparticles used for facilitating carbon nanotube growth are transition metals and various salts thereof. In some embodiments, the catalytic nanoparticles can be deposited on the fiber material using techniques such as, for example, dip coating, spray coating, plasma deposition, evaporation techniques, electrolytic deposition techniques, and other processes known to those of ordinary skill in the art.

Carbon nanotubes can be metallic, semimetallic or semiconducting depending on their chirality. An established system of nomenclature for designating a carbon nanotube's chirality is recognized by those of ordinary skill in the art and is distinguished by a double index (n,m), where n and m are integers that describe the cut and wrapping of hexagonal graphite when formed into a tubular structure. In addition to their chirality, a carbon nanotube's diameter also influences its electrical conductivity and the related property of thermal conductivity. In the synthesis of carbon nanotubes, the carbon nanotube's diameter can be controlled by using catalytic nanoparticles of a given size. Typically, a carbon nanotube's diameter is approximately that of the catalytic nanoparticle that catalyzes its formation. Therefore, the carbon nanotube's properties can be additionally controlled by, for example, adjusting the size of the catalytic nanoparticles used to synthesize the carbon nanotubes. By way of non-limiting example, catalytic nanoparticles having a diameter of about 1 nm can be used to infuse a fiber material with single-wall carbon nanotubes. Larger catalytic nanoparticles can be used to prepare predominantly multi-wall carbon nanotubes, which have larger diameters because of their multiple nanotube layers, or mixtures of single-wall and multi-wall carbon nanotubes. Multi-wall carbon nanotubes typically have a more complex conductivity profile than do single-wall carbon nanotubes due to interwall reactions between the individual nanotube layers that can redistribute current non-uniformly. By contrast, there is no change in current across different portions of a single-wall carbon nanotube.

In some embodiments, the fiber materials further include a barrier coating. Illustrative barrier coatings can include, for example, alkoxysilanes, methylsiloxanes, alumoxanes, alumina nanoparticles, spin on glass and glass nanoparticles. For example, in an embodiment the barrier coating is Accuglass T-11 Spin-On Glass (Honeywell International Inc., Morristown, N.J.). In some embodiments, the catalytic nanoparticles for carbon nanotube synthesis can be combined with the uncured barrier coating material and then applied to the fiber material together. In other embodiments, the barrier coating material can be added to the fiber material prior to deposition of the catalytic nanoparticles. In general, the barrier coating is sufficiently thin to allow exposure of the catalytic nanoparticles to a carbon feedstock gas for carbon nanotube growth. In some embodiments, the thickness of the barrier coating is less than or about equal to the effective diameter of the catalytic nanoparticles. In some embodiments, the thickness of the barrier coating is in a range between about 10 nm and about 100 nm. In other embodiments, the thickness of the barrier coating is in a range between about 10 nm and about 50 nm, including 40 nm. In some embodiments, the thickness of the barrier coating is less than about 10 nm, including about 1 nm, about 2 nm, about 3 nm, about 4 nm, about 5 nm, about 6 nm, about 7 nm, about 8 nm, about 9 nm, and about 10 nm, including all values and subranges therebetween.

Without being bound by theory, the barrier coating can serve as an intermediate layer between the fiber material and the carbon nanotubes and mechanically infuses the carbon nanotubes to the fiber material. Such mechanical infusion provides a robust system in which the fiber material serves as a platform for organizing the carbon nanotubes, while allowing the beneficial properties of the carbon nanotubes to be conveyed to the fiber material. Moreover, benefits of including a barrier coating include protection of the fiber material from chemical damage due to moisture exposure and/or thermal damage at the elevated temperatures used to promote carbon nanotube growth.

After deposition of the catalytic nanoparticles, a chemical vapor deposition (CVD)-based process or other process for growing carbon nanotubes is used to continuously grow carbon nanotubes on the fiber material. The resultant carbon nanotube-infused fiber material is itself a composite architecture. Illustrative processes for carbon nanotube synthesis include, for example, micro-cavity, thermal or plasma-enhanced CVD techniques, laser ablation, arc discharge, and high pressure carbon monoxide (HiPCO) synthesis, all of which are known to those of ordinary skill in the art. In some embodiments, the CVD-based growth process can be plasma-enhanced by providing an electric field during the growth process such that the carbon nanotubes follow the direction of the electric field.

In some embodiments, the carbon nanotubes infused to the fiber material are substantially perpendicular to the longitudinal axis of the fiber material. Stated another way, the carbon nanotubes infused to the fiber material are circumferentially perpendicular to the fiber surface. In other embodiments, the carbon nanotubes infused to the fiber material are substantially parallel to the longitudinal axis of the fiber material.

In some embodiments, the carbon nanotubes infused to the fiber material are unbundled, thereby facilitating strong interactions between the fiber material and the carbon nanotubes. Unbundled carbon nanotubes allow the beneficial carbon nanotube properties to be well expressed in the present composite materials. In other embodiments, the carbon nanotubes infused to the fiber material can be made in the form of a highly uniform, entangled carbon nanotube network by reducing the growth density during carbon nanotube synthesis.

In some embodiments, the carbon nanotubes infused to the fiber material are generally uniform in density distribution, referring to the uniformity of the carbon nanotube density on the fiber material. As defined above, the tolerance for a uniform density distribution is plus or minus about 10% over the fiber material surface area that is infused with carbon nanotubes. By way of non-limiting example, this tolerance is equivalent to about ±1500 carbon nanotubes/$\mu m^2$ for a carbon nanotube having a diameter of 8 nm and 5 walls. Such a figure assumes that the space inside the carbon nanotube is fillable. In some embodiments, the maximum carbon nanotube density, expressed as a percent coverage of the fiber material (i.e., the percentage of the fiber material surface area that is covered with carbon nanotubes) can be as high as about 55%, again assuming a carbon nanotube having an 8 nm diameter, 5 walls and fillable space within. 55% surface area coverage is equivalent to about 15,000 carbon nanotubes/$\mu m^2$ for a carbon nanotube having the referenced dimensions. In some embodiments, the density of carbon nanotube coverage on the fiber material is up to about 15,000 carbon nanotubes/$\mu m^2$. One of ordinary skill in the art will recognize that a wide range of carbon nanotube densities can be attained by varying the disposition of the catalytic nanoparticles on the surface of the fiber material, the exposure time to carbon nanotube growth conditions, and the actual growth conditions themselves used to infuse the carbon nanotubes to the fiber material.

Without being bound by theory or mechanism, Applicants believe that the flame resistance of the present composite materials is due to the thermo-oxidative stability of carbon nanotubes and their density of coverage on the first fiber material in the outer layer. The first plurality of carbon nanotubes in the outer layer serve as a thermal barrier that forms a sacrificial char layer on the exterior surface of the composite material without allowing thermal decomposition to substantially proceed into the inner layer(s) of the composite material. In addition, the high thermal conductivity of carbon nanotubes can be exploited for channeling heat through the outer layer of the composite material while limiting thermal transfer into the inner layer(s). Limiting thermal transfer to the inner layer(s) can be readily accomplished by aligning the first plurality of carbon nanotubes substantially parallel to the longitudinal axis of the first fiber material. By aligning the first plurality of carbon nanotubes in a substantially parallel manner, heat can be channeled along the first fiber material rather than into the inner layer(s) of the composite material.

Once a carbon nanotube-infused fiber material has been formed, alignment of the carbon nanotubes on the fiber material in a substantially parallel manner can be performed by mechanical means, by electromechanical means, by chemical means, by employing a plasma, or other methods known in the art. By way of non-limiting example, a carbon nanotube-infused fiber material having the carbon nanotubes substantially aligned in a parallel manner can be formed according to methods described in Applicants co-pending U.S. Provisional Patent Application 61/300,783, filed Feb. 2, 2010, which is incorporated herein by reference in its entirety. In some embodiments, the process of aligning the carbon nanotubes in a substantially parallel manner can involve forming pi-stacking interactions and/or covalent bonds between the carbon nanotubes, between the carbon nanotubes and the fiber material, and/or between the carbon nanotubes and the polymer matrix. In some embodiments, the process of aligning carbon nanotubes in a substantially parallel manner can involve growing multiple layers of carbon nanotubes on the fiber material by repeating the carbon nanotube growth steps described herein. Alternately, the substantially parallel alignment of carbon nanotubes can take place during the process of infusing the fiber material with carbon nanotubes.

Mechanical means for aligning carbon nanotubes in a substantially parallel manner include, for example, extrusion, pultrusion, gas pressure aided dies, conventional dies and mandrels. Use of these techniques and other related techniques that apply a shearing force in the direction of the longitudinal axis of the fiber material can realign the carbon nanotubes in a carbon nanotube-infused fiber material from a substantially perpendicular orientation into an orientation that is substantially parallel to the longitudinal axis of the fiber material.

Electromechanical means for aligning carbon nanotubes in a substantially parallel manner include, for example, electric or magnetic fields that are aligned parallel to the fiber material during carbon nanotube growth, such that the carbon nanotubes become substantially aligned parallel to the longitudinal axis of the fiber material during the growth process. In forming carbon nanotubes, growth tends to follow the direction of the applied electric or magnetic field. By properly adjusting the geometry of the plasma spray and electric or magnetic field, carbon nanotube-infused fiber materials having substantially parallel aligned carbon nanotubes can be easily formed. This technique beneficially avoids having to realign the carbon nanotubes into a substantially parallel alignment after carbon nanotube infusion.

Chemical means for aligning carbon nanotubes include use of solvents, surfactants, and microemulsions that result in a sheathing effect as the fiber material is drawn out of a liquid containing these chemicals. Thus, drawing a carbon nanotube-infused fiber material from a liquid can realign the carbon nanotubes into a substantially parallel orientation. In some embodiments, chemical alignment can also include crosslinking between adjacent perpendicularly-aligned carbon nanotubes with a bifunctional polymer through formation of covalent bonds and/or pi-stacking interactions. The crosslinked carbon nanotubes can then be induced into a substantially parallel alignment through any of the aforementioned techniques. A particularly suitable bifunctional polymer for crosslinking carbon nanotubes is KENTERA available from Zyvex Technologies.

Figure 5:
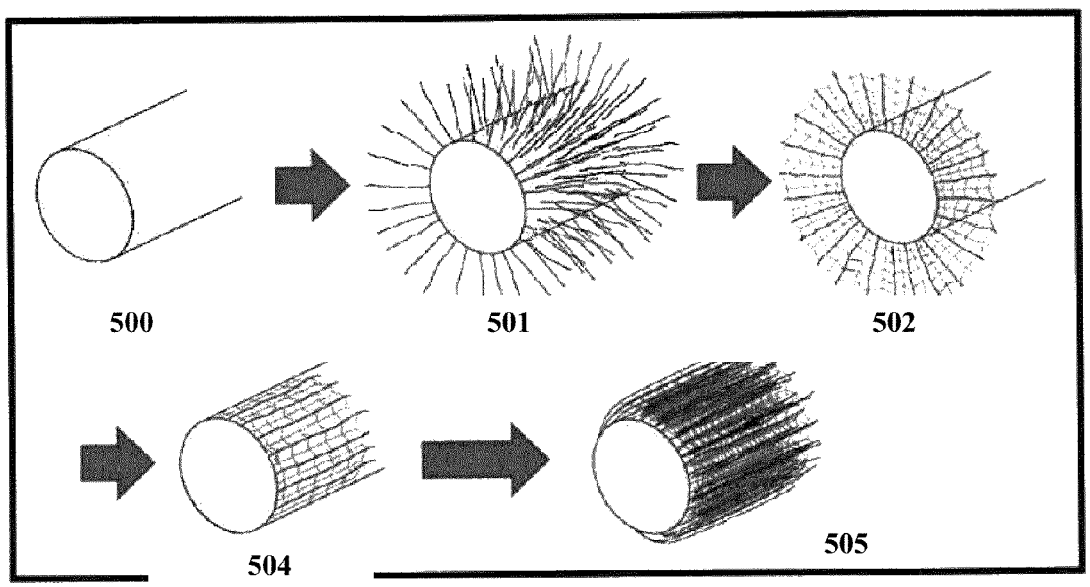
FIG. 5 shows an illustrative chemical process through which carbon nanotube-infused fiber materials having substantially parallel aligned carbon nanotubes can be prepared.

FIG. 5 shows an illustrative chemical process through which carbon nanotube-infused fiber materials having substantially parallel aligned carbon nanotubes can be prepared. Starting with fiber material 500, carbon nanotube-infused fiber material 501 is initially prepared according to some of the procedures set forth herein. Carbon nanotube-infused fiber material 501 has the carbon nanotubes infused to the fiber material in a substantially perpendicular orientation to the fiber surface. Next, carbon nanotube-infused fiber material 501 is treated to form crosslinks between the carbon nanotubes in crosslinked carbon nanotube-infused fiber material 502. The crosslinked carbon nanotubes are then converted into a substantially parallel orientation in parallel-aligned carbon nanotube-infused fiber material 504. Optionally, additional catalytic nanoparticles suitable for forming carbon nanotubes can be deposited on parallel-aligned carbon nanotube-infused fiber material 504. Thereafter, additional layers of carbon nanotubes can be deposited to form multi-layer parallel-aligned carbon nanotube-infused fiber material 505. Optionally, the catalytic nanoparticles can be removed after each layer deposition.

In some embodiments of the present flame-resistant composites, the first carbon nanotube-infused fiber material is aligned substantially parallel to the exterior surface of the composite material. In further embodiments, the first plurality of carbon nanotubes are also aligned substantially parallel to the longitudinal axis of the first fiber material. Thus, in such embodiments, the first plurality of carbon nanotubes is also aligned substantially parallel to the exterior surface of the composite material. In still further embodiments, each fiber of the first carbon nanotube-infused fiber material is aligned substantially parallel in the outer layer. Thus, in such embodiments, both the fiber material and the carbon nanotubes are aligned in a substantially parallel manner. In addition, in such embodiments, both the fiber material and the carbon nanotubes are aligned substantially parallel to the exterior surface of the composite material. As noted above, parallel alignment of the carbon nanotubes and fiber material can be advantageous for limiting thermal transfer into inner layer(s) of the composite material. Furthermore, parallel alignment of the carbon nanotubes and/or the fiber material can be advantageous for conferring a higher mechanical strength to the composite material.

In additional embodiments, the carbon nanotubes and/or the fiber material in the inner layer(s) of the flame-resistant composite material can also be aligned in a substantially parallel manner. Although not generally used to facilitate heat transfer in this case, substantially parallel alignment of the carbon nanotubes and/or the second carbon nanotube-infused fiber material can confer improved mechanical strength to the inner layer(s) of the composite material.

Furthermore, in some embodiments, the second carbon nanotube-infused fiber material in the inner layer(s) of the composite materials can be oriented in a cross-ply pattern. That is, in some embodiments, the second carbon nanotube-infused fiber material is oriented in a plurality of inner layers, each containing second carbon nanotube-infused fiber materials that are aligned substantially parallel to one another in each inner layer and aligned substantially perpendicular to the substantially parallel aligned second carbon nanotube-infused fiber materials in alternating inner layers. Such cross-ply patterns are known to those of ordinary skill in the art and can be prepared by conventional composite manufacturing techniques including, for example, laying up techniques. Cross-ply orientation of the second carbon nanotube-infused fiber material in the inner layer(s) can beneficially improve mechanical strength of the inner layers in two-dimensions.

In either a substantially parallel or cross-ply orientation of the second carbon nanotube-infused fiber materials, the carbon nanotubes can be in any desired orientation on the second fiber material. In some embodiments, the second plurality of carbon nanotubes are substantially parallel to the longitudinal axis of the second fiber material. In other embodiments, the second plurality of carbon nanotubes are substantially perpendicular to the longitudinal axis of the second fiber material.

In the present flame-resistant composite materials, the carbon nanotube-infused fiber material of either the outer layer or the inner layer(s) can be in the form continuous fibers and/or chopped fibers. As used herein, a chopped fiber is a fiber material that is not of spoolable dimensions. A chopped fiber is generally formed by cutting a continuous carbon nanotube-infused fiber material into small lengths, generally about 1 inch in length or less. As used herein, a continuous fiber has a length that is of spoolable dimensions. Although a continuous fiber can have variable lengths in the present flame-resistant composites, it is generally true that continuous fibers have a greater length than do chopped fibers. Further, the length of a continuous fiber in the present composite materials will vary based on the design and intended application of the composite material.

In some embodiments, at least one of the first carbon nanotube-infused fiber material or the second carbon nanotube-infused fiber material includes chopped fibers. In some embodiments, at least one of the first carbon nanotube-infused fiber material or the second carbon nanotube-infused fiber material includes continuous fibers. In some embodiments, the first carbon nanotube-infused fiber material in the outer layer includes chopped fibers, and the second carbon nanotube-infused fiber in the inner layer(s) includes chopped fibers. In other embodiments, the first carbon nanotube-infused fiber material in the outer layer includes chopped fibers, and the second carbon nanotube-infused fiber in the inner layer(s) includes continuous fibers. In some embodiments, the first carbon nanotube-infused fiber material in the outer layer includes continuous fibers, and the second carbon nanotube-infused fiber in the inner layer(s) includes continuous fibers. In some embodiments, the first carbon nanotube-infused fiber material in the outer layer includes continuous fibers, and the second carbon nanotube-infused fiber in the inner layer(s) includes chopped fibers. In some embodiments, mixtures of chopped fibers and continuous fibers can be used in either the outer layer and/or the inner layer(s). In embodiments lacking a second carbon nanotube infused fiber material, the first carbon nanotube-infused fiber material can be in the form of either chopped fibers, continuous fibers, or mixtures thereof.

In some embodiments, the flame-resistant composite materials further include a transition layer between the outer layer and the at least one inner layer, where the transition layer contains at least one of the first polymer matrix or the second polymer matrix. In some of these embodiments, the first polymer matrix and the second polymer matrix are the same. In general, polymer matrices not containing carbon nanotube-infused fiber materials are rather poor thermal conductors. Including a transition layer between the outer layer and the at least one inner layer can thus further limit thermal transfer to the at least one inner layer. In some embodiments, the transition layer is free of both carbon nanotubes and a fiber material. In other embodiments, the transition layer further includes a third fiber material that lacks carbon nanotubes. Including a fiber material in the transition layer can avoid forming a structural 'weak spot' in the composite material.

The transition layer between the outer layer and the at least one inner layer can be of any thickness sufficient to limit thermal transfer to the at least one inner layer in a flame event. In some embodiments, the transition layer has a thickness ranging between about 0.001" and about 0.02". In other embodiments, the transition layer has a thickness ranging between about 0.001" and about 0.005" or between about 0.005" and about 0.01".

In alternative embodiments, flame-resistant articles are contemplated by the present disclosure. In some embodiments, flame-resistant articles are structural composite materials such as, but not limited to, those described above. In other embodiments, flame-resistant articles such as, for example, articles of clothing and other consumer goods containing flame-resistant textiles are described herein.

Illustrative articles containing structural composite materials that can benefit from flame resistance include, for example, aerospace and ballistic parts [e.g., nose cones in missiles, leading edges of aircraft wings, primary aircraft structural parts (e.g., flaps, aerofoils, propellers and air brakes, small plane fuselages, helicopter shells and rotor blades), secondary aircraft structural parts (e.g., floors, doors, seats, air conditioners, and secondary tanks) and aircraft motor parts], mine sweeper hulls, helmets, radomes, rocket nozzles, rescue stretchers, and engine components. Likewise, in building and construction, exterior features (e.g., columns, pediments, domes, cornices, and formwork) and interior features (e.g., blinds, sanitary-ware, wall materials, window profiles, and the like) can benefit from structural reinforcement and flame resistance. In the maritime industry, boat hulls, stringers, masts, propellers, rudders and decks can benefit from structural reinforcement and/or flame resistance. The present composite materials can also be used in the heavy transportation industry in large panels for trailer walls, floor panels for railcars, truck cabs, exterior body molding, bus body shells, and cargo containers, for example. In automotive applications, composite materials can be used in interior parts (e.g., trimming, seats, and instrument panels), exterior structures (e.g., body panels, openings, underbody, and front and rear modules), and automotive engine compartment and fuel mechanical area parts (e.g., axles and suspensions, fuel and exhaust systems, and electrical and electronic components).

Articles of clothing and other consumer goods containing flame-resistant textiles offer considerable safety benefits to an end user. Illustrative flame-resistant articles that can incorporate flame-resistant textiles include, for example, articles of clothing where flame resistance is desirable (e.g., firefighter's uniforms, children's pajamas, and children's Halloween costumes), bedding (e.g., sheets, blankets, mattresses and mattress covers), and sacrificial fire blankets. In some embodiments, articles having a flame-resistant textile contain a single layer. In other embodiments, articles having a flame-resistant textile contain multiple layers, some of which can be additional thermal shielding or a textile that lacks carbon nanotubes, for example.

In some embodiments, flame-resistant articles contain an outer layer and an interior layer. The outer layer has an exterior surface and contains a carbon nanotube-infused fiber material. The carbon nanotube-infused fiber material contains a plurality of carbon nanotubes and a fiber material. The interior layer is integral to the outer layer and includes a textile that lacks carbon nanotubes.

Connection of the outer layer to the interior layer can be performed by any method known to those of ordinary skill in the art. Illustrative methods for connecting the outer layer to the interior layer include, for example, sewing, gluing, riveting, laminating, and vulcanizing.

In some embodiments, the outer layer is formed from a woven carbon nanotube-infused fiber material. In other embodiments, the outer layer further contains a plurality of textile fibers lacking carbon nanotubes that are woven with a carbon nanotube-infused fiber material. Any textile fiber known to those of ordinary skill in the art can be woven with the carbon nanotube-infused fiber material. Illustrative fiber types include, for example, natural fibers (e.g., cotton, flax, jute, hemp, modal, bamboo, silk, sinew, wool, catgut, angora, mohair, alpaca and cashmere) and synthetic fibers (e.g., nylon, rayon, aramid, polyester, acrylic, polyolefin and elastomers). In some embodiments, the plurality of textile fibers are elastomeric fibers such as, for example, spandex fibers (a polyurethane-polyurea copolymer), natural rubbers, synthetic rubbers, butyl rubber, nitrile rubber, silicone rubber, chloroprene, styrene-butadiene copolymer, polybutadiene, and fluoroelastomers.

In some embodiments, rather than having discrete textile fibers interwoven with the carbon nanotube-infused fiber material, an elastomeric matrix can be further included in the outer layer. For example, in some embodiments, the carbon nanotube-infused fiber material can be distributed in an elastomeric matrix which can be in the form of a film or a like thin layer. This film or like thin layer containing the carbon nanotube-infused fiber material can then be connected to an interior textile layer to form articles such as those described above.

In general, fiber materials suitable for making the flame-resistant articles can be any of the types previously mentioned above. In some embodiments, the fiber material of the carbon nanotube-infused fiber materials can be, for example, carbon fibers, ceramic fibers, glass fibers, organic (e.g., aramid) fibers, and combinations thereof. Likewise, any additional textile fiber lacking carbon nanotubes that is interwoven with the carbon nanotube-infused fiber materials can be of these types or any of the natural or synthetic fibers mentioned above.

In some embodiments of the flame-resistant articles, the plurality of carbon nanotubes are greater than about 50 μm in length. In other embodiments, the plurality of carbon nanotubes of the outer layer are between about 50 μm and about 100 μm in length. In still other embodiments, the plurality of carbon nanotubes of the outer layer are greater than about 100 μm in length, or greater than about 200 μm in length, or greater than about 300 μm in length, or greater than about 400 μm in length, or greater than about 500 μm in length, or any subrange in between any of these values.

In some embodiments of the flame-resistant articles, the outer layer has a thickness ranging between about 0.005" and about 0.1". In other embodiments, the outer layer has a thickness ranging between about 0.005" and about 0.015" or between about 0.015" and about 0.05". Such thicknesses are advantageous for forming an outer layer that is lightweight and easily flexible while still maintaining flame resistance and/or thermal shielding properties.

Like the composite materials described above, the present flame-resistant articles can also benefit from substantially parallel alignment of the fiber material and/or the carbon nanotubes infused thereon. As noted above, substantially parallel alignment of the fiber material and/or the carbon nanotubes can distribute heat away from the interior layer. Heat distribution can be especially beneficial when the flame-resistant article is an article of clothing, such that the exterior heat is deflected away from a wearer. In some embodiments, the carbon nanotube-infused fiber material is aligned substantially parallel to the exterior surface of the outer layer. In some of these embodiments, the plurality of carbon nanotubes is aligned substantially parallel to the longitudinal axis of the fiber material. In some of these embodiments, each fiber of the carbon nanotube-infused fiber material is aligned substantially parallel to other fibers in the outer layer. In some of these embodiments, each fiber of the carbon nanotube-infused fiber material is aligned substantially parallel to other fibers in the outer layer and the plurality of carbon nanotubes is aligned substantially parallel to the longitudinal axis of each fiber of the fiber material.

Embodiments disclosed herein utilize carbon nanotube-infused fiber materials that are readily prepared by methods described in U.S. patent application Ser. Nos. 12/611,073, 12/611,101 and 12/611,103, each of which is incorporated by reference herein in its entirety. The carbon nanotube infusion processes that follow can be applied to any type of fiber including, for example, carbon fibers, ceramic fibers, glass fibers, and organic fibers for use in the flame-resistant composite materials and articles described herein. The infusion of carbon nanotubes to a fiber material can serve many functions including, for example, as a sizing agent to protect against damage including that arising from, for example, moisture, oxidation, abrasion, ignition and compression. A carbon nanotube-based sizing agent can also serve as an interface between the fiber material and a polymer matrix in a composite material. Additional sizing agents known in the art can also be included with carbon nanotube-based sizing agents in a carbon nanotube-infused fiber material. Illustrative conventional sizing agents vary widely in type and function and include, for example, surfactants, anti-static agents, lubricants, siloxanes, alkoxysilanes, aminosilanes, silanes, silanols, polyvinyl alcohol, starch, and mixtures thereof. Such secondary sizing agents can be used to protect the carbon nanotubes themselves or to impart further properties to the fiber material that are not imparted by the infused carbon nanotubes.

To infuse carbon nanotubes to a fiber material, the carbon nanotubes are synthesized directly on the fiber material. In some embodiments, this is accomplished by first disposing a carbon nanotube-forming catalyst (e.g., catalytic nanoparticles) on the fiber material. A number of preparatory processes can be performed prior to this catalyst deposition.

In some embodiments, the fiber material can be optionally treated with plasma to prepare the surface to accept the catalyst. For example, a plasma treated glass fiber material can provide a roughened glass fiber surface in which the carbon nanotube-forming catalyst can be deposited. In some embodiments, the plasma also serves to "clean" the fiber surface. The plasma process for "roughing" the fiber surface thus facilitates catalyst deposition. The roughness is typically on the scale of nanometers. In the plasma treatment process craters or depressions are formed that are nanometers deep and nanometers in diameter. Such surface modification can be achieved using a plasma of any one or more of a variety of different gases, including, without limitation, argon, helium, oxygen, ammonia, nitrogen and hydrogen.

In some embodiments, where a fiber material being employed has a sizing material associated with it, such sizing can be optionally removed prior to catalyst deposition. In some embodiments, sizing material removal can be accomplished during carbon nanotube synthesis or just prior to carbon nanotube synthesis in a pre-heat step. In other embodiments, some sizing agents can remain throughout the entire carbon nanotube synthesis process.

Yet another optional step prior to or concomitant with deposition of the carbon nanotube-forming catalyst is application of a barrier coating to the fiber material. Barrier coatings are materials designed to protect the integrity of sensitive fiber materials, such as carbon fiber, organic fibers, metal fibers, and the like. Such a barrier coating can include for example an alkoxysilane, an alumoxane, alumina nanoparticles, spin on glass and glass nanoparticles. The carbon nanotube-forming catalyst can be added to the uncured barrier coating material and then applied to the fiber material together, in one embodiment. In other embodiments the barrier coating material can be added to the fiber material prior to deposition of the carbon nanotube-forming catalyst. In such embodiments, the barrier coating can be partially cured prior to catalyst deposition. The barrier coating material can be of a sufficiently thin thickness to allow exposure of the carbon nanotube-forming catalyst to the carbon feedstock gas for subsequent CVD growth. In some embodiments, the barrier coating thickness is less than or about equal to the effective diameter of the carbon nanotube-forming catalyst. Once the carbon nanotube-forming catalyst and the barrier coating are in place, the barrier coating can be fully cured. In some embodiments, the thickness of the barrier coating can be greater than the effective diameter of the carbon nanotube-forming catalyst so long as it still permits access of carbon nanotube feedstock gases to the site of the catalysts. Such barrier coatings can be sufficiently porous to allow access of carbon feedstock gases to the carbon nanotube-forming catalyst. In some embodiments, the carbon nanotube-forming catalyst resides between the fiber material and the barrier coating such that the catalyst serves as a point of infusion to the carbon nanotubes to the fiber material. In such cases, the barrier coating is again sufficiently thin to allow carbon feedstock gases access to the catalyst in order to initiate carbon nanotube growth.

Without being bound by theory, the barrier coating can serve as an intermediate layer between the fiber material and the carbon nanotubes and can also assist in mechanically infusing the carbon nanotubes to the fiber material. Such mechanical infusion provides a robust system in which the fiber material still serves as a platform for organizing the carbon nanotubes and the benefits of mechanical infusion with a barrier coating are similar to the indirect type fusion described hereinabove. Moreover, the benefit of including a barrier coating is the immediate protection it provides the fiber material from chemical damage due to exposure to moisture and/or any thermal damage due to heating of the fiber material at the temperatures used to promote carbon nanotube growth. Regardless of the nature of the actual bonding motif formed between the carbon nanotubes and the fiber material, the infused carbon nanotubes are robustly attached to the fiber material and convey carbon nanotube properties and/or characteristics to the fiber material. In some embodiments, the barrier coating can also include a flame-resistant material.

As described further below, the carbon nanotube-forming catalyst can be prepared as a liquid solution that contains the carbon nanotube-forming catalyst as transition metal nanoparticles. The diameters of the synthesized carbon nanotubes are related to the size of the transition metal nanoparticles as described above.

Carbon nanotube synthesis can be based on a (CVD) process which occurs at elevated temperatures. The specific temperature is a function of catalyst choice, but can typically be in a range of about 500° C. to about 1000° C. Accordingly, carbon nanotube synthesis involves heating the fiber material to a temperature in the aforementioned range to support carbon nanotube growth.

CVD-promoted carbon nanotube growth on the catalyst-laden fiber material is then performed. The CVD process can be promoted by, for example, a carbon-containing feedstock gas such as acetylene, ethylene, and/or ethanol. The carbon nanotube synthesis processes generally use an inert gas (nitrogen, argon, and/or helium) as a primary carrier gas. The carbon-containing feedstock gas is typically provided in a range from between about 0% to about 15% of the total mixture. A substantially inert environment for CVD growth can be prepared by removal of moisture and oxygen from the growth chamber.

In the carbon nanotube synthesis process, carbon nanotubes grow at the sites of a transition metal catalytic nanoparticle that is operable for carbon nanotube growth. The presence of a strong plasma-creating electric field can be optionally employed to affect carbon nanotube growth. That is, the growth tends to follow the direction of the electric field. By properly adjusting the geometry of the plasma spray and electric field, vertically-aligned carbon nanotubes (i.e., perpendicular to the longitudinal axis of the fiber material) can be synthesized. Under certain conditions, even in the absence of a plasma, closely-spaced carbon nanotubes can maintain a substantially vertical growth direction resulting in a dense array of carbon nanotubes resembling a carpet or forest.

The operation of disposing catalytic nanoparticles on the fiber material can be accomplished by spraying or dip coating a solution or by gas phase deposition via, for example, a plasma process. Thus, in some embodiments, after forming a catalyst solution in a solvent, the catalyst can be applied by spraying or dip coating the fiber material with the solution, or combinations of spraying and dip coating. Either technique, used alone or in combination, can be employed once, twice, thrice, four times, up to any number of times to provide a fiber material that is sufficiently uniformly coated with catalytic nanoparticles that are operable for formation of carbon nanotubes. When dip coating is employed, for example, a fiber material can be placed in a first dip bath for a first residence time in the first dip bath. When employing a second dip bath, the fiber material can be placed in the second dip bath for a second residence time. For example, fiber materials can be subjected to a solution of carbon nanotube-forming catalyst for between about 3 seconds to about 90 seconds depending on the dip configuration and linespeed. Employing spraying or dip coating processes, a fiber material with a catalyst surface density of less than about 5% surface coverage to as high as about 80% surface coverage can be obtained. At higher surface densities (e.g., about 80%), the carbon nanotube-forming catalyst nanoparticles are nearly a monolayer. In some embodiments, the process of coating the carbon nanotube-forming catalyst on the fiber material produces no more than a monolayer. For example, carbon nanotube growth on a stack of carbon nanotube-forming catalyst can erode the degree of infusion of the carbon nanotubes to the fiber material. In other embodiments, transition metal catalytic nanoparticles can be deposited on the fiber material using evaporation techniques, electrolytic deposition techniques, and other processes known to those skilled in the art, such as addition of the transition metal catalyst to a plasma feedstock gas as a metal organic, metal salt or other composition promoting gas phase transport.

Because processes to manufacture carbon nanotube-infused fibers are designed to be continuous, a spoolable fiber material can be dip-coated in a series of baths where dip coating baths are spatially separated. In a continuous process in which nascent fibers are being generated de novo, such as newly formed glass fibers from a furnace, dip bath or spraying of a carbon nanotube-forming catalyst can be the first step after sufficiently cooling the newly formed fiber material. In some embodiments, cooling of newly formed glass fibers can be accomplished with a cooling jet of water which has the carbon nanotube-forming catalyst particles dispersed therein.

In some embodiments, application of a carbon nanotube-forming catalyst can be performed in lieu of application of a sizing when generating a fiber and infusing it with carbon nanotubes in a continuous process. In other embodiments, the carbon nanotube-forming catalyst can be applied to newly formed fiber materials in the presence of other sizing agents. Such simultaneous application of a carbon nanotube-forming catalyst and other sizing agents can provide the carbon nanotube-forming catalyst in surface contact with the fiber material to insure carbon nanotube infusion. In yet further embodiments, the carbon nanotube-forming catalyst can be applied to nascent fibers by spray or dip coating while the fiber material is in a sufficiently softened state, for example, near or below the annealing temperature, such that the carbon nanotube-forming catalyst is slightly embedded in the surface of the fiber material. When depositing the carbon nanotube-forming catalyst on hot glass fiber materials, for example, care should be given to not exceed the melting point of the carbon nanotube-forming catalyst, thereby causing nanoparticle fusion and loss of control of the carbon nanotube characteristics (e.g., diameter) as a result.

The carbon nanotube-forming catalyst solution can be a transition metal nanoparticle solution of any d-block transition metal. In addition, the nanoparticles can include alloys and non-alloy mixtures of d-block metals in elemental form, in salt form, and mixtures thereof. Such salt forms include, without limitation, oxides, carbides, and nitrides, acetates, nitrates, and the like. Non-limiting illustrative transition metal nanoparticles include, for example, Ni, Fe, Co, Mo, Cu, Pt, Au, and Ag and salts thereof and mixtures thereof. In some embodiments, such carbon nanotube-forming catalysts are disposed on the fiber material by applying or infusing a carbon nanotube-forming catalyst directly to the fiber material. Many nanoparticle transition metal catalysts are readily commercially available from a variety of suppliers, including, for example, Ferrotec Corporation (Bedford, N.H.).

Catalyst solutions used for applying the carbon nanotube-forming catalyst to the fiber material can be in any common solvent that allows the carbon nanotube-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the carbon nanotube-forming catalytic nanoparticles. Concentrations of carbon nanotube-forming catalyst in the catalyst solution can be in a range from about 1:1 to about 1:10000 catalyst to solvent.

In some embodiments, after applying the carbon nanotube-forming catalyst to the fiber material, the fiber material can be optionally heated to a softening temperature. This step can aid in embedding the carbon nanotube-forming catalyst in the surface of the fiber material to encourage seeded growth and prevent tip growth where the catalyst floats at the tip of the leading edge a growing carbon nanotube. In some embodiments heating of the fiber material after disposing the carbon nanotube-forming catalyst on the fiber material can be at a temperature between about 500° C. and about 1000° C. Heating to such temperatures, which can be used for carbon nanotube growth, can serve to remove any pre-existing sizing agents on the fiber material allowing deposition of the carbon nanotube-forming catalyst directly on the fiber material. In some embodiments, the carbon nanotube-forming catalyst can also be placed on the surface of a sizing coating prior to heating. The heating step can be used to remove sizing material while leaving the carbon nanotube-forming catalyst disposed on the surface of the fiber material. Heating at these temperatures can be performed prior to or substantially simultaneously with introduction of a carbon-containing feedstock gas for carbon nanotube growth.

In some embodiments, the process of infusing carbon nanotubes to a fiber material includes removing sizing agents from the fiber material, applying a carbon nanotube-forming catalyst to the fiber material after sizing removal, heating the fiber material to at least about 500° C., and synthesizing carbon nanotubes on the fiber material. In some embodiments, operations of the carbon nanotube infusion process include removing sizing from a fiber material, applying a carbon nanotube-forming catalyst to the fiber material, heating the fiber material to a temperature operable for carbon nanotube synthesis and spraying a carbon plasma onto the catalyst-laden fiber material. Thus, where commercial fiber materials are employed, processes for constructing carbon nanotube-infused fibers can include a discrete step of removing sizing from the fiber material before disposing the catalyst on the fiber material. Some commercial sizing materials, if present, can prevent surface contact of the carbon nanotube-forming catalyst with the fiber material and inhibit carbon nanotube infusion to the fiber material. In some embodiments, where sizing removal is assured under carbon nanotube synthesis conditions, sizing removal can be performed after deposition of the carbon nanotube forming catalyst but just prior to or during providing a carbon-containing feedstock gas.

The step of synthesizing carbon nanotubes can include numerous techniques for forming carbon nanotubes, including, without limitation, micro-cavity, thermal or plasma-enhanced CVD techniques, laser ablation, arc discharge, and high pressure carbon monoxide (HiPCO). During CVD, in particular, a sized fiber material with carbon nanotube-forming catalyst disposed thereon, can be used directly. In some embodiments, any conventional sizing agents can be removed during carbon nanotube synthesis. In some embodiments other sizing agents are not removed, but do not hinder carbon nanotube synthesis and infusion to the fiber material due to the diffusion of the carbon-containing feedstock gas through the sizing. In some embodiments, acetylene gas is ionized to create a jet of cold carbon plasma for carbon nanotube synthesis. The plasma is directed toward the catalyst-laden fiber material. Thus, in some embodiments synthesizing carbon nanotubes on a fiber material includes (a) forming a carbon plasma; and (b) directing the carbon plasma onto the catalyst disposed on the fiber material. The diameters of the carbon nanotubes that are grown are dictated by the size of the carbon nanotube-forming catalyst. In some embodiments, a sized fiber material is heated to between about 550° C. and about 800° C. to facilitate carbon nanotube synthesis. To initiate the growth of carbon nanotubes, two or more gases are bled into the reactor: an inert carrier gas (e.g., argon, helium, or nitrogen) and a carbon-containing feedstock gas (e.g., acetylene, ethylene, ethanol or methane). Carbon nanotubes grow at the sites of the carbon nanotube-forming catalyst.

In some embodiments, a CVD growth can be plasma-enhanced. A plasma can be generated by providing an electric field during the growth process. Carbon nanotubes grown under these conditions can follow the direction of the electric field. Thus, by adjusting the geometry of the reactor, vertically aligned carbon nanotubes can be grown where the carbon nanotubes are perpendicular to the longitudinal axis of the fiber material (i.e., radial growth). In some embodiments, a plasma is not required for radial growth to occur about the fiber material. For fiber materials that have distinct sides such as, for example, tapes, mats, fabrics, plies, and the like, the carbon nanotube-forming catalyst can be disposed on one or both sides of the fiber material. Correspondingly, under such conditions, carbon nanotubes can be grown on one or both sides of the fiber material as well.

As described above, the carbon nanotube synthesis is performed at a rate sufficient to provide a continuous process for infusing spoolable fiber materials with carbon nanotubes. Numerous apparatus configurations facilitate such a continuous synthesis as exemplified below.

In some embodiments, carbon nanotube-infused fiber materials can be prepared in an "all-plasma" process. In such embodiments, the fiber materials pass through numerous plasma-mediated steps to form the final carbon nanotube-infused fiber materials. The first of the plasma processes, can include a step of fiber surface modification. This is a plasma process for "roughing" the surface of the fiber material to facilitate catalyst deposition, as described above. As also described above, surface modification can be achieved using a plasma of any one or more of a variety of different gases, including, without limitation, argon, helium, oxygen, ammonia, hydrogen, and nitrogen.

After surface modification, the fiber material proceeds to catalyst application. In the present all plasma process, this step is a plasma process for depositing the carbon nanotube-forming catalyst on the fiber material. The carbon nanotube-forming catalyst is typically a transition metal as described above. The transition metal catalyst can be added to a plasma feedstock gas as a precursor in non-limiting forms including, for example, a ferrofluid, a metal organic, a metal salt, mixtures thereof or any other composition suitable for promoting gas phase transport. The carbon nanotube-forming catalyst can be applied at room temperature in ambient environment with neither vacuum nor an inert atmosphere being required. In some embodiments, the fiber material is cooled prior to catalyst application.

Continuing the all-plasma process, carbon nanotube synthesis occurs in a carbon nanotube-growth reactor. Carbon nanotube growth can be achieved through the use of plasma-enhanced chemical vapor deposition, wherein carbon plasma is sprayed onto the catalyst-laden fibers. Since carbon nanotube growth occurs at elevated temperatures (typically in a range of about 500° C. to about 1000° C. depending on the catalyst), the catalyst-laden fibers can be heated prior to being exposed to the carbon plasma. For the carbon nanotube infusion process, the fiber material can be optionally heated until softening occurs. After heating, the fiber material is ready to receive the carbon plasma. The carbon plasma is generated, for example, by passing a carbon-containing feedstock gas such as, for example, acetylene, ethylene, ethanol, and the like, through an electric field that is capable of ionizing the gas. This cold carbon plasma is directed, via spray nozzles, to the fiber material. The fiber material can be in close proximity to the spray nozzles, such as within about 1 centimeter of the spray nozzles, to receive the plasma. In some embodiments, heaters are disposed above the fiber material at the plasma sprayers to maintain the elevated temperature of the fiber material.

Another configuration for continuous carbon nanotube synthesis involves a special rectangular reactor for the synthesis and growth of carbon nanotubes directly on fiber materials. The reactor can be designed for use in a continuous in-line process for producing carbon nanotube-infused fiber materials. In some embodiments, carbon nanotubes are grown via a CVD process at atmospheric pressure and an elevated temperature in the range of about 550° C. and about 800° C. in a multi-zone reactor. The fact that the carbon nanotube synthesis occurs at atmospheric pressure is one factor that facilitates the incorporation of the reactor into a continuous processing line for carbon nanotube infusion to the fiber materials. Another advantage consistent with in-line continuous processing using such a zone reactor is that carbon nanotube growth occurs in seconds, as opposed to minutes (or longer), as in other procedures and apparatus configurations typical in the art.

In general, the carbon nanotube-infused fiber materials prepared as described herein have carbon nanotubes that are substantially uniform in length. In the continuous processes described herein, the residence time of the fiber material in a growth chamber can be modulated to control growth and length of the carbon nanotubes, thus providing a means to control specific carbon nanotube properties. Carbon nanotube length can also be controlled through modulation of the reaction temperature and the flow rates of the carbon feedstock and carrier gas.

Carbon nanotube synthesis reactors in accordance with the various embodiments include the following features:

Rectangular Configured Synthesis Reactors: The cross-section of a typical carbon nanotube synthesis reactor known in the art is circular. There are a number of reasons for this including, for example, historical reasons (e.g., cylindrical reactors are often used in laboratories) and convenience (e.g., flow dynamics are easy to model in cylindrical reactors, heater systems readily accept circular tubes (e.g., quartz, etc.), and ease of manufacturing. Departing from the cylindrical convention, the present disclosure provides a carbon nanotube synthesis reactor having a rectangular cross section. The reasons for the departure include at least the following:

1) Inefficient Use of Reactor Volume. Since many fiber materials that can be processed by the reactor are relatively planar (e.g., flat tapes, sheet-like forms, or spread tows or rovings), a circular cross-section is an inefficient use of the reactor volume. This inefficiency results in several drawbacks for cylindrical carbon nanotube synthesis reactors including, for example, a) maintaining a sufficient system purge; increased reactor volume requires increased gas flow rates to maintain the same level of gas purge, resulting in inefficiencies for high volume production of carbon nanotubes in an open environment; b) increased carbon-containing feedstock gas flow rates; the relative increase in inert gas flow for system purge, as per a) above, requires increased carbon-containing feedstock gas flow rates. Consider that the volume of an illustrative 12K glass fiber roving is 2000 times less than the total volume of a synthesis reactor having a rectangular cross-section. In an equivalent cylindrical reactor (i.e., a cylindrical reactor that has a width that accommodates the same planarized glass fiber material as the rectangular cross-section reactor), the volume of the glass fiber material is 17,500 times less than the volume of the reactor. Although gas deposition processes, such as CVD, are typically governed by pressure and temperature alone, volume can have a significant impact on the efficiency of deposition. With a rectangular reactor there is a still excess volume, and this excess volume facilitates unwanted reactions. However, a cylindrical reactor has about eight times that volume available for facilitating unwanted reactions. Due to this greater opportunity for competing reactions to occur, the desired reactions effectively occur more slowly in a cylindrical reactor. Such a slow down in carbon nanotube growth, is problematic for the development of continuous growth processes. Another benefit of a rectangular reactor configuration is that the reactor volume can be decreased further still by using a small height for the rectangular chamber to make the volume ratio better and the reactions even more efficient. In some embodiments disclosed herein, the total volume of a rectangular synthesis reactor is no more than about 3000 times greater than the total volume of a fiber material being passed through the synthesis reactor. In some further embodiments, the total volume of the rectangular synthesis reactor is no more than about 4000 times greater than the total volume of the fiber material being passed through the synthesis reactor. In some still further embodiments, the total volume of the rectangular synthesis reactor is less than about 10,000 times greater than the total volume of the fiber material being passed through the synthesis reactor. Additionally, it is notable that when using a cylindrical reactor, more carbon-containing feedstock gas is required to provide the same flow percent as compared to reactors having a rectangular cross section. It should be appreciated that in some other embodiments, the synthesis reactor has a cross-section that is described by polygonal forms that are not rectangular, but are relatively similar thereto and provide a similar reduction in reactor volume relative to a reactor having a circular cross section; and c) problematic temperature distribution; when a relatively small-diameter reactor is used, the temperature gradient from the center of the chamber to the walls thereof is minimal, but with increased reactor size, such as would be used for commercial-scale production, such temperature gradients increase. Temperature gradients result in product quality variations across the fiber material (i.e., product quality varies as a function of radial position). This problem is substantially avoided when using a reactor having a rectangular cross-section. In particular, when a planar substrate is used, reactor height can be maintained constant as the size of the substrate scales upward. Temperature gradients between the top and bottom of the reactor are essentially negligible and, as a consequence, thermal issues and the product-quality variations that result are avoided.

2) Gas introduction. Because tubular furnaces are normally employed in the art, typical carbon nanotube synthesis reactors introduce gas at one end and draw it through the reactor to the other end. In some embodiments disclosed herein, gas can be introduced at the center of the reactor or within a target growth zone, symmetrically, either through the sides or through the top and bottom plates of the reactor. This improves the overall carbon nanotube growth rate because the incoming feedstock gas is continuously replenishing at the hottest portion of the system, which is where carbon nanotube growth is most active.

Zoning. Chambers that provide a relatively cool purge zone extend from both ends of the rectangular synthesis reactor. Applicants have determined that if a hot gas were to mix with the external environment (i.e., outside of the rectangular reactor), there would be increased degradation of the fiber material. The cool purge zones provide a buffer between the internal system and external environments. Carbon nanotube synthesis reactor configurations known in the art typically require that the substrate is carefully (and slowly) cooled. The cool purge zone at the exit of the present rectangular carbon nanotube growth reactor achieves the cooling in a short period of time, as required for continuous in-line processing.

Non-contact, hot-walled, metallic reactor. In some embodiments, a metallic hot-walled reactor (e.g., stainless steel) is employed. Use of this type of reactor can appear counterintuitive because metal, and stainless steel in particular, is more susceptible to carbon deposition (i.e., soot and by-product formation). Thus, most carbon nanotube synthesis reactors are made from quartz because there is less carbon deposited, quartz is easier to clean, and quartz facilitates sample observation. However, Applicants have observed that the increased soot and carbon deposition on stainless steel results in more consistent, efficient, faster, and stable carbon nanotube growth. Without being bound by theory it has been indicated that, in conjunction with atmospheric operation, the CVD process occurring in the reactor is diffusion limited.

That is, the carbon nanotube-forming catalyst is "overfed;" too much carbon is available in the reactor system due to its relatively higher partial pressure (than if the reactor was operating under partial vacuum). As a consequence, in an open system—especially a clean one—too much carbon can adhere to the particles of carbon nanotube-forming catalyst, compromising their ability to synthesize carbon nanotubes. In some embodiments, the rectangular reactor is intentionally run when the reactor is "dirty," that is with soot deposited on the metallic reactor walls. Once carbon deposits to a monolayer on the walls of the reactor, carbon will readily deposit over itself Since some of the available carbon is "withdrawn" due to this mechanism, the remaining carbon feedstock, in the form of radicals, react with the carbon nanotube-forming catalyst at a rate that does not poison the catalyst. Existing systems run "cleanly" which, if they were open for continuous processing, would produce a much lower yield of carbon nanotubes at reduced growth rates.

Although it is generally beneficial to perform carbon nanotube synthesis "dirty" as described above, certain portions of the apparatus (e.g., gas manifolds and inlets) can nonetheless negatively impact the carbon nanotube growth process when soot creates blockages. In order to combat this problem, such areas of the carbon nanotube growth reaction chamber can be protected with soot inhibiting coatings such as, for example, silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

Combined Catalyst Reduction and Carbon Nanotube Synthesis. In the carbon nanotube synthesis reactor disclosed herein, both catalyst reduction and carbon nanotube growth occur within the reactor. This is significant because the reduction step cannot be accomplished timely enough for use in a continuous process if performed as a discrete operation. In a typical process known in the art, a reduction step typically takes 1-12 hours to perform. Both operations occur in a reactor in accordance with the present disclosure due, at least in part, to the fact that carbon-containing feedstock gas is introduced at the center of the reactor, not the end as would be typical in the art using cylindrical reactors. The reduction process occurs as the fiber material enters the heated zone. By this point, the gas has had time to react with the walls and cool off prior to reducing the catalyst (via hydrogen radical interactions). It is this transition region where the reduction occurs. At the hottest isothermal zone in the system, carbon nanotube growth occurs, with the greatest growth rate occurring proximal to the gas inlets near the center of the reactor.

In some embodiments, when loosely affiliated fiber materials including, for example, tows or rovings are employed (e.g., as glass roving), the continuous process can include steps that spread out the strands and/or filaments of the tow or roving. Thus, as a tow or roving is unspooled it can be spread using a vacuum-based fiber spreading system, for example. When employing sized glass fiber rovings, for example, which can be relatively stiff, additional heating can be employed in order to "soften" the roving to facilitate fiber spreading. The spread fibers which comprise individual filaments can be spread apart sufficiently to expose an entire surface area of the filaments, thus allowing the roving to more efficiently react in subsequent process steps. For example, a spread tow or roving can pass through a surface treatment step that is composed of a plasma system as described above. The roughened, spread fibers then can pass through a carbon nanotube-forming catalyst dip bath. The result is fibers of the glass roving that have catalyst particles distributed radially on their surface. The catalyzed-laden fibers of the roving then enter an appropriate carbon nanotube growth chamber, such as the rectangular chamber described above, where a flow through atmospheric pressure CVD or plasma enhanced-CVD process is used to synthesize carbon nanotubes at rates as high as several microns per second. The fibers of the roving, now having radially aligned carbon nanotubes, exit the carbon nanotube growth reactor.

It is to be understood that modifications which do not substantially affect the activity of the various embodiments of this invention are also included within the definition of the invention provided herein. Although the invention has been described with reference to the disclosed embodiments, those skilled in the art will readily appreciate that these only illustrative of the invention. It should be understood that various modifications can be made without departing from the spirit of the invention. In some instances, well-known structures, materials, and/or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is the following:

1. A flame-resistant composite material comprising:
an outer layer comprising a first polymer matrix and a first carbon nanotube-infused fiber material;
wherein the outer layer has an exterior surface; and
wherein the first carbon nanotube-infused fiber material comprises a first plurality of carbon nanotubes and a first fiber material;
wherein the first plurality of carbon nanotubes are greater than about 50 μm in length; and
at least one inner layer comprising a second polymer matrix.

2. The flame-resistant composite material of claim 1, wherein the at least one inner layer further comprises at least one component selected from the group consisting of a second fiber material, a second carbon nanotube-infused fiber material comprising a second plurality of carbon nanotubes and a second fiber material, and combinations thereof.

3. The flame-resistant composite material of claim 2, wherein a thickness of the outer layer ranges between about 0.005" and about 0.1".

4. The flame-resistant composite material of claim 2, wherein the first fiber material and the second fiber material are the same.

5. The flame-resistant composite material of claim 2, wherein the first fiber material and the second fiber material are different.

6. The flame-resistant composite material of claim 1, wherein the first polymer matrix and the second polymer matrix are the same.

7. The flame-resistant composite material of claim 1, wherein the first polymer matrix and the second polymer matrix are different.

8. The flame-resistant composite material of claim 1, wherein a thickness of the outer layer ranges between about 0.005" and about 0.1".

9. The flame-resistant composite material of claim 1, wherein the at least one inner layer further comprises a second carbon nanotube-infused fiber material;
wherein the second carbon nanotube-infused fiber material comprises a second plurality of carbon nanotubes and a second fiber material;
wherein the second plurality of carbon nanotubes are less than about 50 µm in length.

10. The flame-resistant composite material of claim 9, further comprising a transition layer between the outer layer and the at least one inner layer;
wherein the transition layer comprises at least one of the first polymer matrix or the second polymer matrix.

11. The flame-resistant composite material of claim 10, wherein the transition layer further comprises a third fiber material that lacks carbon nanotubes.

12. The flame-resistant composite material of claim 9, wherein the first polymer matrix and the second polymer matrix comprise an epoxy.

13. The flame-resistant composite material of claim 9, wherein at least one of the first carbon nanotube-infused fiber material or the second carbon nanotube-infused fiber material comprises continuous fibers.

14. The flame-resistant composite material of claim 9, wherein at least one of the first carbon nanotube-infused fiber material or the second carbon nanotube-infused fiber material comprises chopped fibers.

15. The flame-resistant composite material of claim 9, wherein the first carbon nanotube-infused fiber material is aligned substantially parallel to the exterior surface.

16. The flame-resistant composite material of claim 15, wherein the first plurality of carbon nanotubes are aligned substantially parallel to the longitudinal axis of the first fiber material.

17. The flame-resistant composite material of claim 15, wherein each fiber of the first carbon nanotube-infused fiber material is aligned substantially parallel in the outer layer.

18. The flame-resistant composite material of claim 9, wherein the first plurality of carbon nanotubes comprise between about 0.1% and about 20% of the outer layer by weight.

19. The flame-resistant composite material of claim 9, wherein the second plurality of carbon nanotubes comprise between about 0.1% and about 10% of the at least one inner layer by weight.

20. The flame-resistant composite material of claim 9, wherein the first fiber material and the second fiber material are independently selected from the group consisting of carbon fibers, ceramic fibers, glass fibers, organic fibers, and combinations thereof.

21. The flame-resistant composite material of claim 9, wherein the at least one inner layer comprises a plurality of inner layers, each comprising second carbon nanotube-infused fiber materials that are aligned substantially parallel to one another in each inner layer;
wherein the substantially parallel aligned second carbon nanotube-infused fiber materials in each inner layer are aligned substantially perpendicular to the substantially parallel aligned second carbon nanotube-infused fiber materials in alternating inner layers.

22. The flame-resistant composite material of claim 1, wherein the first carbon nanotube-infused fiber material comprises chopped fibers.

23. The flame-resistant composite material of claim 1, wherein the first carbon nanotube-infused fiber material comprises continuous fibers.

24. The flame-resistant composite material of claim 1, wherein the first carbon nanotube-infused fiber material is aligned substantially parallel to the exterior surface.

25. The flame-resistant composite material of claim 24, wherein the first plurality of carbon nanotubes are aligned substantially parallel to the longitudinal axis of the first fiber material.

26. The flame-resistant composite material of claim 24, wherein each fiber of the first carbon nanotube-infused fiber material is aligned substantially parallel in the outer layer.

27. The flame-resistant composite material of claim 1, wherein the first fiber material is selected from the group consisting of carbon fibers, ceramic fibers, glass fibers, organic fibers, and combinations thereof.

28. A flame-resistant composite material comprising:
an epoxy matrix comprising an outer layer and at least one inner layer;
wherein the outer layer has an exterior surface and a thickness that ranges between about 0.005" and about 0.1";
a first carbon nanotube-infused fiber material in the outer layer;
wherein the first carbon nanotube-infused fiber material comprises a first plurality of carbon nanotubes and a first fiber material;
wherein the first plurality of carbon nanotubes are greater than about 50 µm in length; and
a second carbon nanotube-infused fiber material in the at least one inner layer;
wherein the second carbon nanotube-infused fiber material comprises a second plurality of carbon nanotubes and a second fiber material.

29. The flame-resistant composite material of claim 28, wherein the second plurality of carbon nanotubes are less than about 50 µm in length.

30. The flame-resistant composite material of claim 28, wherein the first carbon nanotube-infused fiber material comprises continuous fibers.

31. The flame-resistant composite material of claim 30, wherein the second carbon nanotube-infused fiber material comprises a form selected from the group consisting of continuous fibers, chopped fibers, and combinations thereof.

32. The flame-resistant composite material of claim 28, wherein the first carbon nanotube-infused fiber material comprises chopped fibers.

33. The flame-resistant composite material of claim 32, wherein the second carbon nanotube-infused fiber material comprises a form selected from the group consisting of continuous fibers, chopped fibers, and combinations thereof.

34. The flame-resistant composite material of claim 28, wherein the first fiber material and the second fiber material are independently selected from the group consisting of carbon fibers, ceramic fibers, glass fibers, organic fibers, and combinations thereof.

35. The flame-resistant composite material of claim 28, further comprising a transition layer comprising the epoxy matrix that is located between the outer layer and the at least one inner layer.

36. The flame-resistant composite material of claim 35, wherein the transition layer further comprises a third fiber material that lacks carbon nanotubes.

37. The flame-resistant composite material of claim 28, wherein the first carbon nanotube-infused fiber material comprises between about 1% and about 30% carbon nanotubes by weight.

38. The flame-resistant composite material of claim 28, wherein the first plurality of carbon nanotubes and the second plurality of carbon nanotubes collectively comprise less than about 10% of the flame-resistant composite material by weight.

39. The flame-resistant composite material of claim 28, wherein the first plurality of carbon nanotubes comprise between about 0.1% and about 20% of the outer layer by weight.

40. The flame-resistant composite material of claim 28, wherein the second plurality of carbon nanotubes comprise between about 0.1% and about 10% of the at least one inner layer by weight.

41. The flame-resistant composite material of claim 28, wherein the second plurality of carbon nanotubes comprise a lower weight percentage of the flame-resistant composite material than does the first plurality of carbon nanotubes.

42. The flame-resistant composite material of claim 28, wherein the first carbon nanotube-infused fiber material is aligned substantially parallel to the exterior surface.

43. The flame-resistant composite material of claim 42, wherein the first plurality of carbon nanotubes are aligned substantially parallel to the longitudinal axis of the first fiber material.

44. The flame-resistant composite material of claim 42, wherein each fiber of the first carbon nanotube-infused fiber material is aligned substantially parallel in the outer layer.

45. A flame-resistant article comprising:
an outer layer having an exterior surface and comprising a carbon nanotube-infused fiber material;
wherein the carbon nanotube-infused fiber material comprises a plurality of carbon nanotubes and a fiber material; and
an interior layer integral to the outer layer and comprising a textile that lacks carbon nanotubes.

46. The flame-resistant article of claim 45, wherein the outer layer further comprises a plurality of textile fibers lacking carbon nanotubes that are woven with the carbon nanotube-infused fiber material.

47. The flame-resistant article of claim 46, wherein the plurality of textile fibers comprise elastomeric fibers.

48. The flame-resistant article of claim 45, wherein the outer layer further comprises an elastomeric matrix.

49. The flame-resistant article of claim 45, wherein the plurality of carbon nanotubes are greater than about 50 μm in length.

50. The flame-resistant article of claim 45, wherein the outer layer has a thickness ranging between about 0.005" and about 0.1".

51. The flame-resistant article of claim 45, wherein the carbon nanotube-infused fiber material is aligned substantially parallel to the exterior surface.

52. The flame-resistant article of claim 51, wherein the plurality of carbon nanotubes are aligned substantially parallel to the longitudinal axis of the fiber material.

53. The flame-resistant article of claim 51, wherein each fiber of the carbon nanotube-infused fiber material is aligned substantially parallel in the outer layer.

54. The flame-resistant article of claim 45, wherein the fiber material is selected from the group consisting of carbon fibers, ceramic fibers, glass fibers, organic fibers, and combinations thereof.

* * * * *